United States Patent
Kamijo et al.

(10) Patent No.: US 6,370,870 B1
(45) Date of Patent: Apr. 16, 2002

(54) EXHAUST GAS PURIFYING DEVICE

(75) Inventors: Motohisa Kamijo, Yokohama; Maki Kamikubo, Yokosuka; Hiroshi Akama, Zushi; Jyunji Itou, Yokohama; Motohiro Shinzawa, Yokosuka; Yasuhisa Kitahara, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/417,012

(22) Filed: Oct. 12, 1999

(30) Foreign Application Priority Data

Oct. 14, 1998 (JP) .......................... 10-291581
Nov. 11, 1998 (JP) .......................... 10-319689

(51) Int. Cl.$^7$ ................................ F01N 3/00
(52) U.S. Cl. ..................... 60/286; 60/278; 60/280; 60/284; 60/285; 60/288; 60/300
(58) Field of Search .............. 60/278, 280, 284, 60/285, 286, 288, 295, 300, 301, 274

(56) References Cited

U.S. PATENT DOCUMENTS

| | | | | |
|---|---|---|---|---|
| 5,007,237 A | * | 4/1991 | Müller | 60/285 |
| 5,174,111 A | * | 12/1992 | Nomura et al. | 60/285 |
| 5,211,010 A | * | 5/1993 | Hirota | 60/285 |
| 5,357,749 A | * | 10/1994 | Ohsuga et al. | 60/286 |
| 5,473,887 A | | 12/1995 | Takeshima et al. | |
| 5,522,219 A | * | 6/1996 | Orzel et al. | 60/288 |
| 5,595,060 A | * | 1/1997 | Togai et al. | 60/285 |
| 5,642,705 A | * | 7/1997 | Morikawa et al. | 60/285 |
| 5,651,247 A | * | 7/1997 | Fänkle | 60/286 |
| 5,713,199 A | * | 2/1998 | Takeshima et al. | 60/285 |
| 5,732,554 A | * | 3/1998 | Sasaki et al. | 60/285 |
| 5,775,099 A | * | 7/1998 | Ito et al. | 60/274 |
| 5,804,148 A | * | 9/1998 | Kanesaka et al. | 60/300 |
| 5,839,275 A | * | 11/1998 | Hirota et al. | 60/285 |
| 5,867,982 A | * | 2/1999 | Tengblad et al. | 60/285 |
| 5,947,080 A | * | 9/1999 | Weissman et al. | 60/274 |
| 5,950,421 A | * | 9/1999 | Chattha et al. | 60/301 |
| 5,992,144 A | * | 11/1999 | Takanohashi et al. | 60/285 |
| 6,003,306 A | * | 12/1999 | Kalversberg et al. | 60/278 |
| 6,125,628 A | * | 10/2000 | Itami et al. | 60/285 |

FOREIGN PATENT DOCUMENTS

JP     6-212961     8/1994

\* cited by examiner

Primary Examiner—Thomas Denion
Assistant Examiner—Tu M. Nguyen
(74) Attorney, Agent, or Firm—Foley & Lardner

(57) ABSTRACT

A nitrogen oxide absorbing material (38) which absorbs nitrogen oxide when the reduction component concentration of exhaust gas in the exhaust passage (31) of an engine (1) is lower than a predetermined concentration, and discharges nitrogen oxide when the reduction component concentration of exhaust gas in the exhaust passage (31) of the engine (1) is higher than the predetermined concentration, and a catalyst (38) which promotes reduction of the discharged nitrogen oxides by a reduction component are provided. A controller (40) first reduces the reduction component concentration of the exhaust gas over a first predetermined time period by, for example, advancing the fuel injection timing. The controller (40) then increases the reduction component concentration of the exhaust gas over a second predetermined time period by, for example, retarding the fuel injection timing.

26 Claims, 25 Drawing Sheets

2 HIGH PRESSURE PUMP
4 SOLENOID VALVE
6 COMMON RAIL
8 FUEL INJECTOR
9 PRESSURE SENSOR
13 INTAKE MANIFOLD
17 ACTUATOR
21 INTERCOOLER
25 BYPASS CONTROL VALVE
30 EXHAUST MANIFOLD
32 NOZZLE VANE ACTUATOR
33 NOZZLE VANE
37 EXHAUST GAS RECIRCULATION CONTROL VALVE
38 CATALYTIC CONVERTER

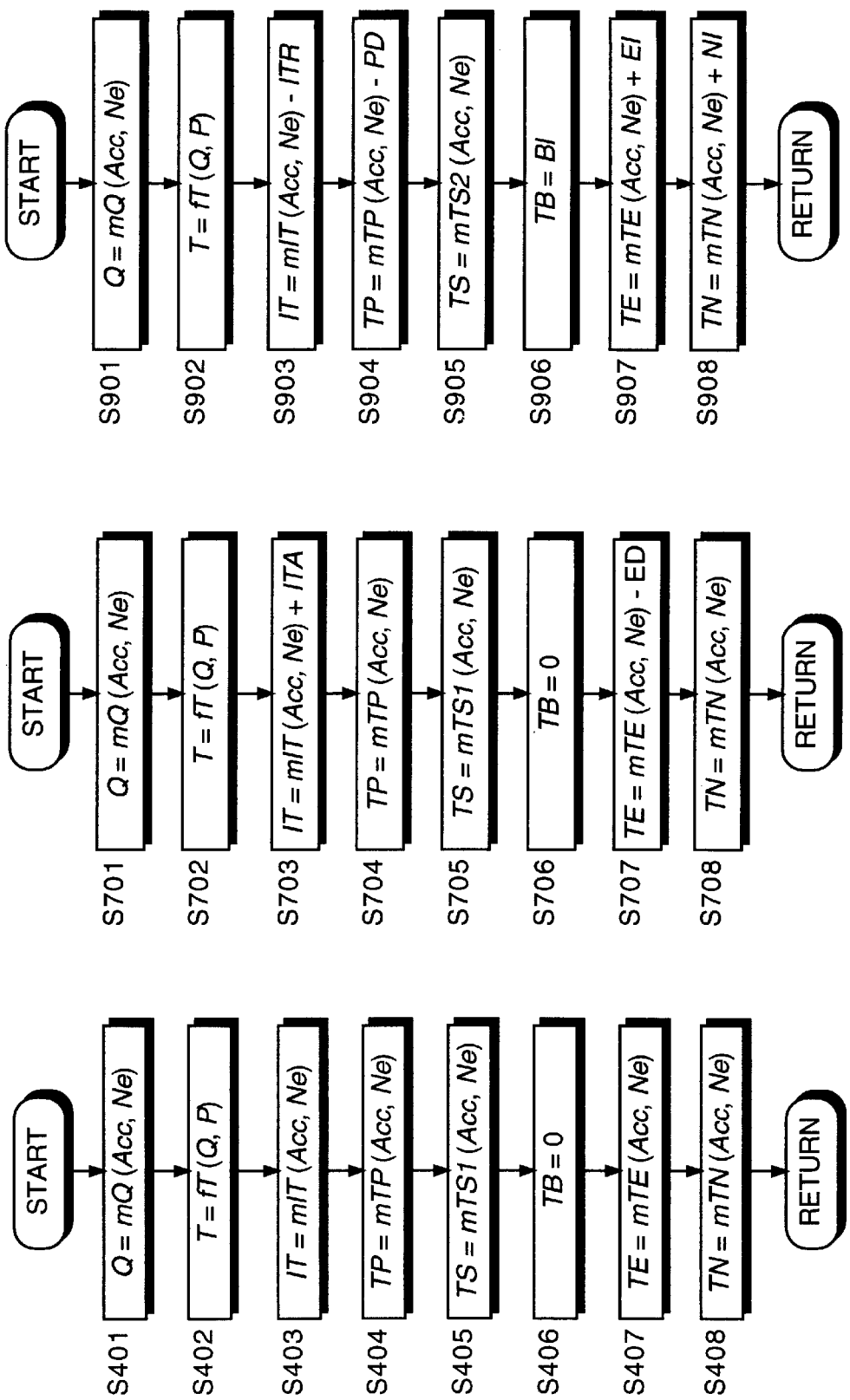

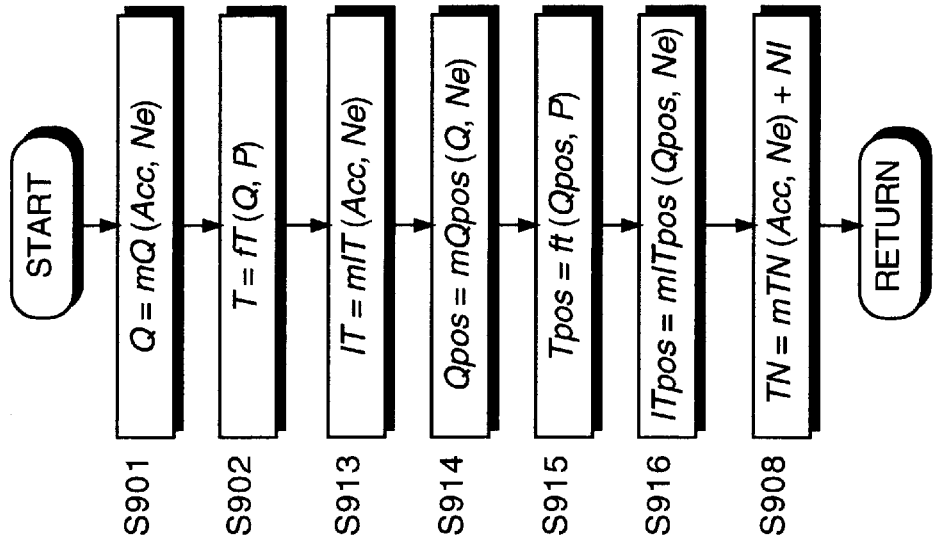
FIG. 15
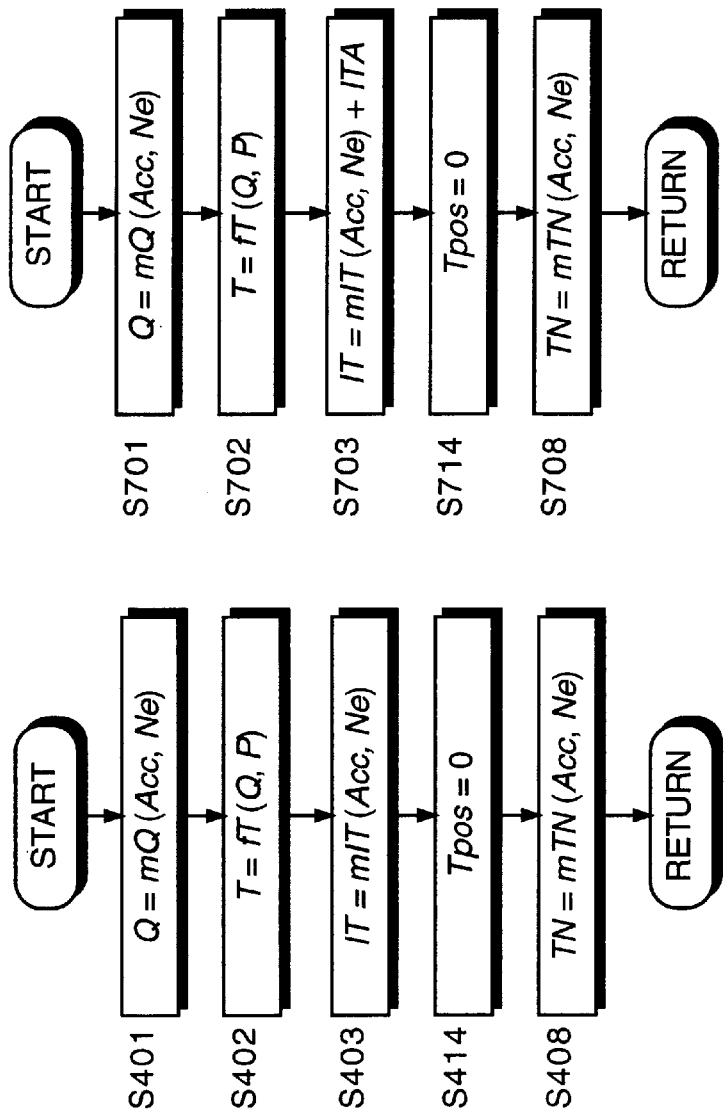
FIG. 14
FIG. 13

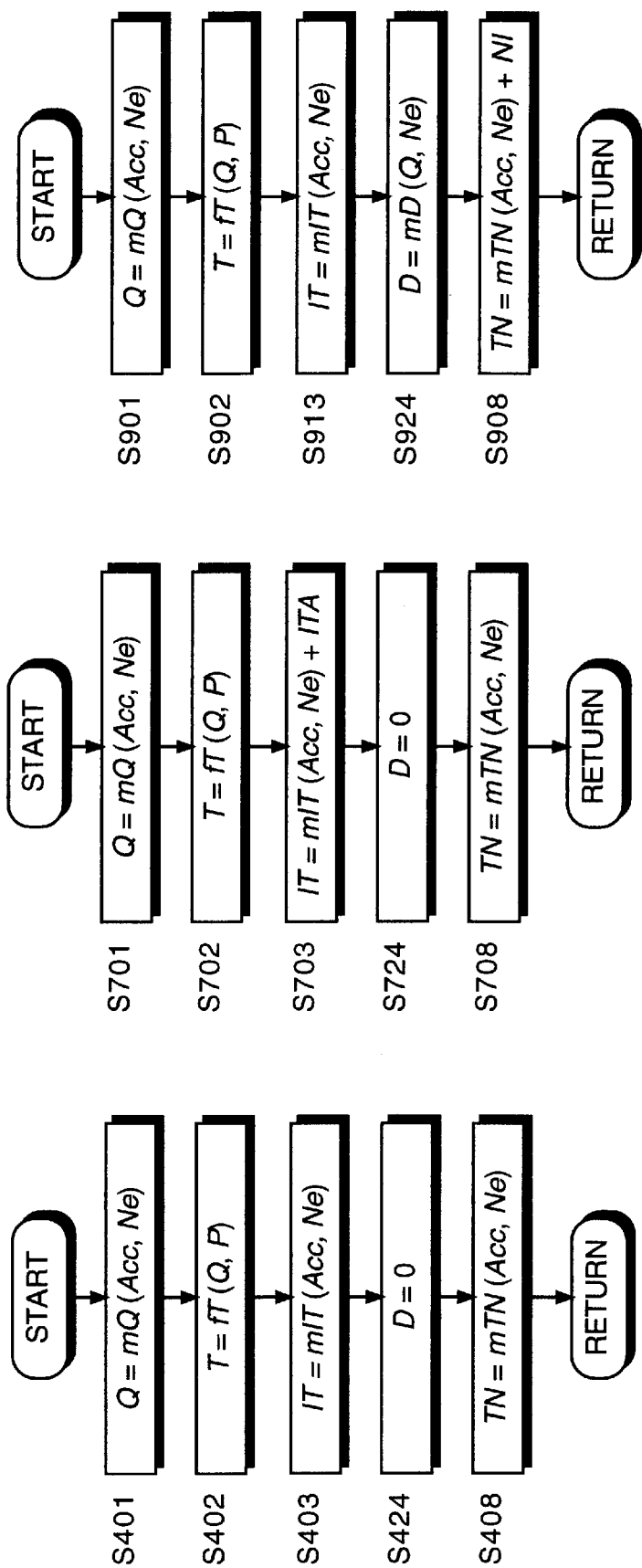

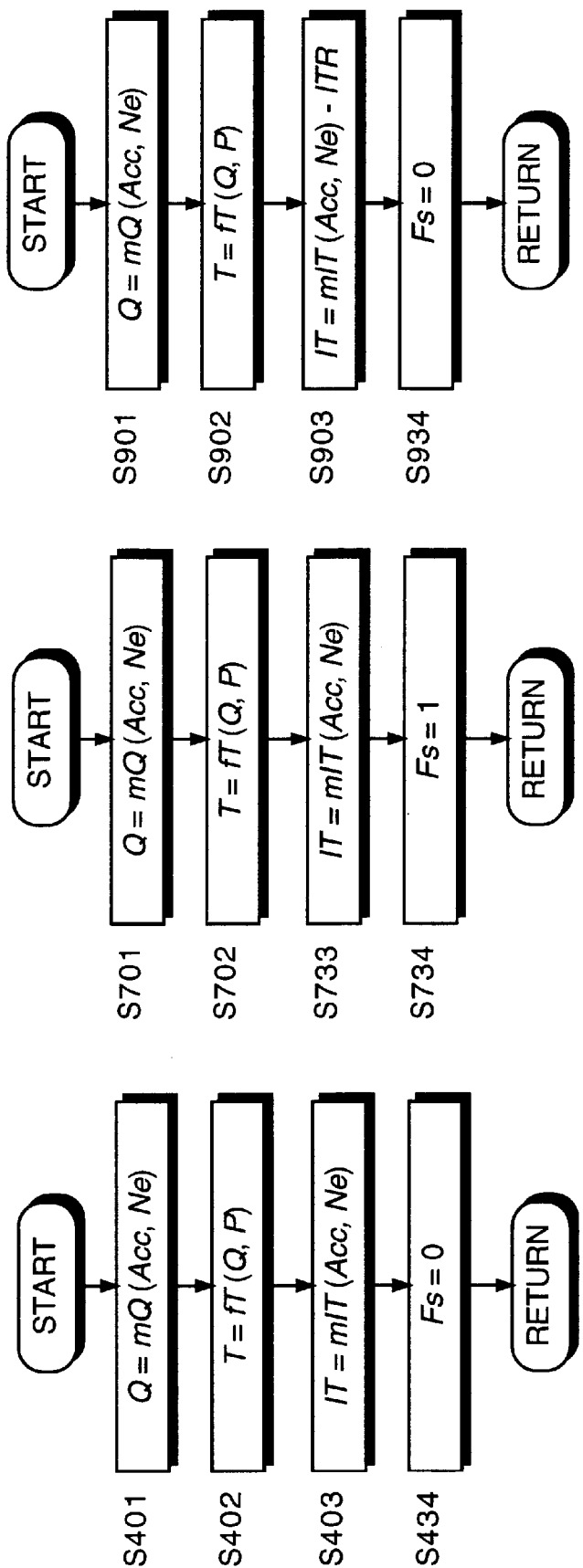

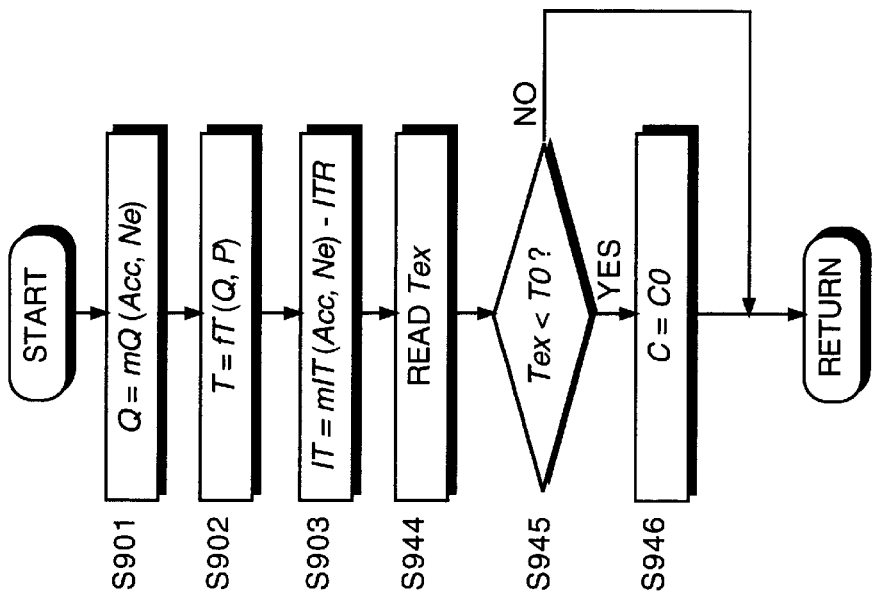
FIG. 28
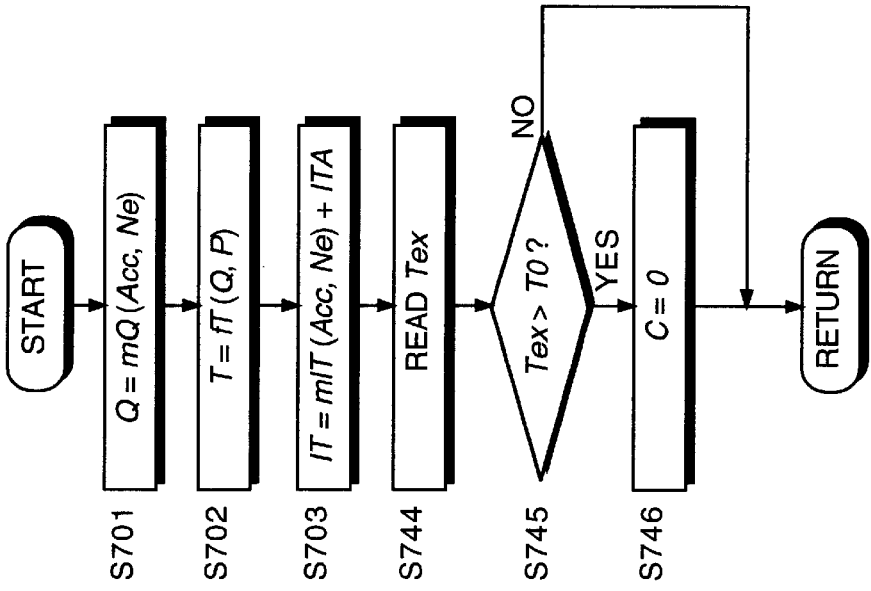
FIG. 27
FIG. 26

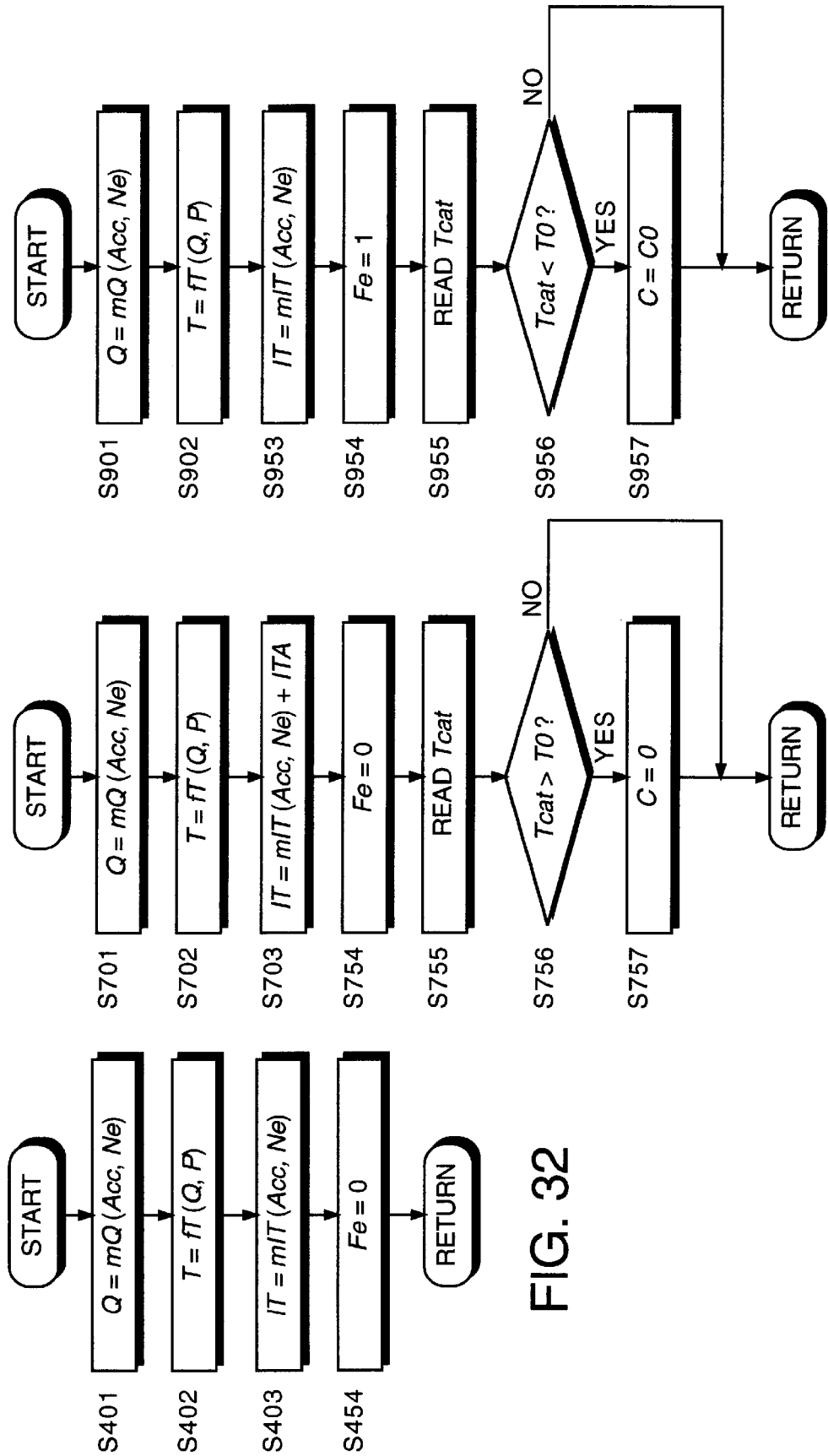

| EXAMPLE NO. | RARE METAL | gram/ liter | ADSORBENT A | gram/ liter | ADSORBENT B | gram/ liter | SUBSTRATE | gram/ liter | NOx RELEASE RATE | NOx REDUCTION RATE |
|---|---|---|---|---|---|---|---|---|---|---|
| #1 | PLATINUM | 1.18 | BARIUM | 15.0 | — | — | ALUMINA | 100 | 73 | 35 |
| #2 | PALLADIUM | 0.64 | BARIUM | 15.0 | — | — | ALUMINA | 100 | 72 | 31 |
| #3 | RHODIUM | 0.62 | BARIUM | 15.0 | — | — | ALUMINA | 100 | 74 | 33 |
| #4 | IRIDIUM | 1.16 | BARIUM | 15.0 | — | — | ALUMINA | 100 | 65 | 43 |
| #5 | PLATINUM | 1.18 | POTASSIUM | 15.0 | — | — | ALUMINA | 100 | 70 | 35 |
| #6 | PLATINUM | 1.18 | SODIUM | 15.0 | — | — | ALUMINA | 100 | 69 | 42 |
| #7 | PLATINUM | 1.18 | LITHIUM | 15.0 | — | — | ALUMINA | 100 | 69 | 41 |
| #8 | PLATINUM | 1.18 | CESIUM | 15.0 | — | — | ALUMINA | 100 | 72 | 41 |
| #9 | PLATINUM | 1.18 | MAGNESIUM | 15.0 | — | — | ALUMINA | 100 | 70 | 32 |
| #10 | PLATINUM | 1.18 | CALCIUM | 15.0 | — | — | ALUMINA | 100 | 73 | 30 |
| #11 | PLATINUM | 1.18 | STRONTIUM | 15.0 | — | — | β-ZEOLITE | 100 | 72 | 32 |
| #12 | PLATINUM | 1.18 | LANTHANUM | 15.0 | — | — | ALUMINA | 100 | 71 | 35 |
| #13 | PLATINUM | 1.18 | CERIUM | 15.0 | — | — | ALUMINA | 100 | 71 | 34 |
| #14 | PLATINUM | 1.18 | YTTRIUM | 15.0 | — | — | ALUMINA | 100 | 70 | 33 |
| #15 | PLATINUM | 1.18 | PRASEODYMIUM | 15.0 | — | — | ALUMINA | 100 | 75 | 32 |
| #16 | PLATINUM | 1.18 | NEODYMIUM | 15.0 | — | — | ALUMINA | 100 | 71 | 30 |
| #17 | PLATINUM | 1.18 | SAMARIUM | 15.0 | — | — | SILICA | 100 | 72 | 31 |
| #18 | PLATINUM | 1.18 | ZIRCONIUM | 15.0 | — | — | ALUMINA | 100 | 73 | 35 |
| #19 | PLATINUM | 1.18 | MANGANESE | 15.0 | — | — | ALUMINA | 100 | 71 | 34 |
| #20 | PLATINUM | 1.18 | IRON | 15.0 | — | — | ALUMINA | 100 | 73 | 35 |
| #21 | PLATINUM | 1.18 | NICKEL | 15.0 | — | — | β-ZEOLITE | 100 | 74 | 35 |
| #22 | PLATINUM | 1.18 | COBALT | 15.0 | — | — | ALUMINA | 100 | 71 | 36 |
| #23 | PLATINUM | 1.18 | TUNGSTEN | 15.0 | — | — | ALUMINA | 100 | 70 | 33 |
| #24 | PLATINUM | 1.18 | MOLYBDENUM | 15.0 | — | — | TITANIA | 100 | 71 | 32 |
| #25 | PLATINUM | 1.18 | BARIUM | 15.0 | — | — | SILICA | 100 | 72 | 32 |
| #26 | PLATINUM | 1.18 | IRON | 15.0 | — | — | β-ZEOLITE | 100 | 73 | 33 |
| #27 | PLATINUM | 1.18 | IRON | 15.0 | — | — | ZSM5 | 100 | 72 | 34 |
| #28 | PLATINUM | 1.18 | CERIUM | 15.0 | — | — | TITANIA | 100 | 71 | 32 |
| #29 | PLATINUM | 1.18 | LANTHANUM | 15.0 | — | — | SILICA·ALUMINA | 100 | 70 | 33 |

FIG.38

| EXAMPLE NO. | RARE METAL | gram/liter | ADSORBENT A | gram/liter | ADSORBENT B | gram/liter | SUBSTRATE | gram/liter | NOx RELEASE RATE | NOx REDUCTION RATE |
|---|---|---|---|---|---|---|---|---|---|---|
| #30 | PLATINUM | 1.18 | BARIUM | 7.0 | POTASSIUM | 2.0 | ALUMINA | 100 | 75 | 37 |
| #31 | PLATINUM | 1.18 | BARIUM | 7.0 | SODIUM | 1.2 | β-ZEOLITE | 100 | 75 | 38 |
| #32 | PLATINUM | 1.18 | BARIUM | 7.0 | LITHIUM | 0.4 | SILICA·ALUMINA | 100 | 74 | 37 |
| #33 | PLATINUM | 1.18 | BARIUM | 7.0 | CESIUM | 6.8 | ZSM5 | 100 | 76 | 39 |
| #34 | PLATINUM | 1.18 | BARIUM | 7.0 | MAGNESIUM | 1.2 | ALUMINA | 100 | 76 | 40 |
| #35 | PLATINUM | 1.18 | BARIUM | 7.0 | CALCIUM | 2.0 | ALUMINA | 100 | 74 | 38 |
| #36 | PLATINUM | 1.18 | BARIUM | 7.0 | STRONTIUM | 4.5 | ALUMINA | 100 | 76 | 39 |
| #37 | PLATINUM | 1.18 | BARIUM | 7.0 | LANTHANUM | 7.1 | SILICA | 100 | 77 | 36 |
| #38 | PLATINUM | 1.18 | BARIUM | 7.0 | CERIUM | 7.1 | TITANIA | 100 | 74 | 36 |
| #39 | PLATINUM | 1.18 | BARIUM | 7.0 | YTTRIUM | 4.5 | ALUMINA | 100 | 78 | 39 |
| #40 | PLATINUM | 1.18 | BARIUM | 7.0 | PRASEODYMIUM | 7.2 | ALUMINA | 100 | 74 | 38 |
| #41 | PLATINUM | 1.18 | BARIUM | 7.0 | NEODYMIUM | 7.4 | β-ZEOLITE | 100 | 75 | 36 |
| #42 | PLATINUM | 1.18 | BARIUM | 7.0 | SAMARIUM | 7.7 | SILICA·ALUMINA | 100 | 76 | 38 |
| #43 | PLATINUM | 1.18 | BARIUM | 7.0 | ZIRCONIUM | 4.6 | ALUMINA | 100 | 74 | 39 |
| #44 | PLATINUM | 1.18 | BARIUM | 7.0 | MANGANESE | 2.8 | ALUMINA | 100 | 76 | 38 |
| #45 | PLATINUM | 1.18 | BARIUM | 7.0 | IRON | 2.8 | ALUMINA | 100 | 78 | 37 |
| #46 | PLATINUM | 1.18 | BARIUM | 7.0 | NICKEL | 3.0 | ALUMINA | 100 | 76 | 36 |
| #47 | PLATINUM | 1.18 | BARIUM | 7.0 | COBALT | 3.0 | SILICA | 100 | 77 | 38 |
| #48 | PALLADIUM | 0.64 | POTASSIUM | 2.0 | SODIUM | 1.2 | TITANIA | 100 | 73 | 37 |
| #49 | RHODIUM | 0.62 | POTASSIUM | 2.0 | LITHIUM | 0.4 | ALUMINA | 100 | 72 | 38 |
| #50 | IRIDIUM | 1.16 | POTASSIUM | 2.0 | CESIUM | 6.8 | ALUMINA | 100 | 74 | 36 |
| #51 | PALLADIUM | 0.64 | POTASSIUM | 2.0 | MAGNESIUM | 1.2 | β-ZEOLITE | 100 | 74 | 38 |
| #52 | PALLADIUM | 0.64 | POTASSIUM | 2.0 | CALCIUM | 2.0 | ALUMINA | 100 | 72 | 39 |
| #53 | PALLADIUM | 0.64 | POTASSIUM | 2.0 | STRONTIUM | 4.5 | ZSM5 | 100 | 74 | 38 |
| #54 | PALLADIUM | 0.64 | POTASSIUM | 2.0 | LANTHANUM | 7.1 | ALUMINA | 100 | 75 | 37 |
| #55 | PALLADIUM | 0.64 | POTASSIUM | 2.0 | CERIUM | 7.1 | ALUMINA | 100 | 75 | 36 |
| #56 | PALLADIUM | 0.64 | POTASSIUM | 2.0 | YTTRIUM | 4.5 | ALUMINA | 100 | 76 | 38 |
| #57 | PALLADIUM | 0.64 | POTASSIUM | 2.0 | PRASEODYMIUM | 7.2 | SILICA | 100 | 72 | 38 |

FIG.39

| EXAMPLE NO. | RARE METAL | gram/ liter | ADSORBENT A | gram/ liter | ADSORBENT B | gram/ liter | SUBSTRATE | gram/ liter | NOx RELEASE RATE | NOx REDUCTION RATE |
|---|---|---|---|---|---|---|---|---|---|---|
| #58 | PALLADIUM | 0.64 | POTASSIUM | 2.0 | NEODYMIUM | 7.4 | TITANIA | 100 | 73 | 37 |
| #59 | PALLADIUM | 0.64 | POTASSIUM | 2.0 | SAMARIUM | 7.7 | ALUMINA | 100 | 74 | 39 |
| #60 | PALLADIUM | 0.64 | POTASSIUM | 2.0 | ZIRCONIUM | 4.6 | ALUMINA | 100 | 72 | 40 |
| #61 | PALLADIUM | 0.64 | POTASSIUM | 2.0 | MANGANESE | 2.8 | β-ZEOLITE | 100 | 74 | 38 |
| #62 | PALLADIUM | 0.64 | POTASSIUM | 2.0 | IRON | 2.8 | SILICA·ALUMINA | 100 | 76 | 39 |
| #63 | PALLADIUM | 0.64 | POTASSIUM | 2.0 | NICKEL | 3.0 | ALUMINA | 100 | 74 | 36 |
| #64 | PALLADIUM | 0.64 | POTASSIUM | 2.0 | COBALT | 3.0 | ALUMINA | 100 | 75 | 36 |
| #65 | RHODIUM | 0.62 | SODIUM | 1.2 | LITHIUM | 0.4 | ALUMINA | 100 | 73 | 43 |
| #66 | PALLADIUM | 0.64 | SODIUM | 1.2 | CECIUM | 6.8 | ALUMINA | 100 | 72 | 43 |
| #67 | IRIDIUM | 1.16 | SODIUM | 1.2 | MAGNESIUM | 1.2 | SILICA | 100 | 73 | 44 |
| #68 | RHODIUM | 0.62 | SODIUM | 1.2 | CALCIUM | 2.0 | TITANIA | 100 | 74 | 43 |
| #69 | RHODIUM | 0.62 | SODIUM | 1.2 | STRONTIUM | 4.5 | ALUMINA | 100 | 72 | 45 |
| #70 | RHODIUM | 0.62 | SODIUM | 1.2 | LANTHANUM | 7.1 | ALUMINA | 100 | 74 | 46 |
| #71 | RHODIUM | 0.62 | SODIUM | 1.2 | CERIUM | 7.1 | β-ZEOLITE | 100 | 76 | 46 |
| #72 | RHODIUM | 0.62 | SODIUM | 1.2 | YTTRIUM | 4.5 | ALUMINA | 100 | 74 | 45 |
| #73 | RHODIUM | 0.62 | SODIUM | 1.2 | PRASEODYMIUM | 7.2 | ZSM5 | 100 | 75 | 43 |
| #74 | RHODIUM | 0.62 | SODIUM | 1.2 | NEODYMIUM | 7.4 | ALUMINA | 100 | 72 | 43 |
| #75 | RHODIUM | 0.62 | SODIUM | 1.2 | SAMARIUM | 7.7 | ALUMINA | 100 | 74 | 46 |
| #76 | RHODIUM | 0.62 | SODIUM | 1.2 | ZIRCONIUM | 4.6 | ALUMINA | 100 | 74 | 44 |
| #77 | RHODIUM | 0.62 | SODIUM | 1.2 | MANGANESE | 2.8 | SILICA | 100 | 72 | 43 |
| #78 | RHODIUM | 0.62 | SODIUM | 1.2 | IRON | 2.8 | TITANIA | 100 | 74 | 46 |
| #79 | RHODIUM | 0.62 | SODIUM | 1.2 | NICKEL | 3.0 | ALUMINA | 100 | 75 | 45 |
| #80 | RHODIUM | 0.62 | SODIUM | 1.2 | COBALT | 3.0 | ALUMINA | 100 | 74 | 44 |
| #81 | IRIDIUM | 1.16 | LITHIUM | 0.4 | CECIUM | 6.8 | β-ZEOLITE | 100 | 72 | 41 |
| #82 | PALLADIUM | 0.64 | LITHIUM | 0.4 | MAGNESIUM | 1.2 | SILICA·ALUMINA | 100 | 76 | 43 |
| #83 | RHODIUM | 1.16 | LITHIUM | 0.4 | CALCIUM | 2.0 | ALUMINA | 100 | 72 | 43 |
| #84 | IRIDIUM | 1.16 | LITHIUM | 0.4 | STRONTIUM | 4.5 | ALUMINA | 100 | 73 | 46 |

FIG.40

| EXAMPLE NO. | RARE METAL | gram/ liter | ADSORBENT A | gram/ liter | ADSORBENT B | gram/ liter | SUBSTRATE | gram/ liter | NOx RELEASE RATE | NOx REDUCTION RATE |
|---|---|---|---|---|---|---|---|---|---|---|
| #85 | IRIDIUM | 1.16 | LITHIUM | 0.4 | LANTHANUM | 7.1 | ALUMINA | 100 | 77 | 44 |
| #86 | IRIDIUM | 1.16 | LITHIUM | 0.4 | CERIUM | 7.1 | ALUMINA | 100 | 75 | 43 |
| #87 | IRIDIUM | 1.16 | LITHIUM | 0.4 | YTTRIUM | 4.5 | SILICA | 100 | 75 | 46 |
| #88 | IRIDIUM | 1.16 | LITHIUM | 0.4 | PRASEODYMIUM | 7.2 | TITANIA | 100 | 72 | 45 |
| #89 | IRIDIUM | 1.16 | LITHIUM | 0.4 | NEODYMIUM | 7.4 | ALUMINA | 100 | 74 | 44 |
| #90 | IRIDIUM | 1.16 | LITHIUM | 0.4 | SAMARIUM | 7.7 | ALUMINA | 100 | 72 | 43 |
| #91 | IRIDIUM | 1.16 | LITHIUM | 0.4 | ZIRCONIUM | 4.6 | β-ZEOLITE | 100 | 73 | 44 |
| #92 | IRIDIUM | 1.16 | LITHIUM | 0.4 | MANGANESE | 2.8 | ALUMINA | 100 | 73 | 43 |
| #93 | IRIDIUM | 1.16 | LITHIUM | 0.4 | IRON | 2.8 | ZSM5 | 100 | 72 | 45 |
| #94 | IRIDIUM | 1.16 | LITHIUM | 0.4 | NICKEL | 3.0 | ALUMINA | 100 | 74 | 46 |
| #95 | IRIDIUM | 1.16 | LITHIUM | 0.4 | COBALT | 3.0 | ALUMINA | 100 | 74 | 46 |
| #96 | PLATINUM | 1.18 | CECIUM | 6.8 | MAGNESIUM | 1.2 | ALUMINA | 100 | 74 | 44 |
| #97 | PLATINUM | 1.18 | CECIUM | 6.8 | CALCIUM | 2.0 | SILICA | 100 | 73 | 43 |
| #98 | PLATINUM | 1.18 | CECIUM | 6.8 | STRONTIUM | 4.5 | TITANIA | 100 | 75 | 44 |
| #99 | PLATINUM | 1.18 | CECIUM | 6.8 | LANTHANUM | 7.1 | ALUMINA | 100 | 76 | 43 |
| #100 | PLATINUM | 1.18 | CECIUM | 6.8 | CERIUM | 7.1 | ALUMINA | 100 | 74 | 45 |
| #101 | PLATINUM | 1.18 | CECIUM | 6.8 | YTTRIUM | 4.5 | β-ZEOLITE | 100 | 78 | 46 |
| #102 | PLATINUM | 1.18 | CECIUM | 6.8 | PRASEODYMIUM | 7.2 | SILICA·ALUMINA | 100 | 74 | 46 |
| #103 | PLATINUM | 1.18 | CECIUM | 6.8 | NEODYMIUM | 7.4 | ALUMINA | 100 | 75 | 43 |
| #104 | PLATINUM | 1.18 | CECIUM | 6.8 | SAMARIUM | 7.7 | ALUMINA | 100 | 77 | 46 |
| #105 | PLATINUM | 1.18 | CECIUM | 6.8 | ZIRCONIUM | 4.6 | ALUMINA | 100 | 75 | 44 |
| #106 | PLATINUM | 1.18 | CECIUM | 6.8 | MANGANESE | 2.8 | ALUMINA | 100 | 76 | 43 |
| #107 | PLATINUM | 1.18 | CECIUM | 6.8 | IRON | 2.8 | SILICA | 100 | 76 | 43 |
| #108 | PLATINUM | 1.18 | CECIUM | 6.8 | NICKEL | 3.0 | TITANIA | 100 | 75 | 46 |
| #109 | PLATINUM | 1.18 | CECIUM | 6.8 | COBALT | 3.0 | ALUMINA | 100 | 77 | 45 |
| #110 | PLATINUM | 1.18 | MAGNESIUM | 1.2 | CALCIUM | 2.0 | ALUMINA | 100 | 73 | 35 |
| #111 | PLATINUM | 1.18 | MAGNESIUM | 1.2 | STRONTIUM | 4.5 | β-ZEOLITE | 100 | 71 | 33 |
| #112 | PLATINUM | 1.18 | MAGNESIUM | 1.2 | LANTHANUM | 7.1 | ALUMINA | 100 | 75 | 35 |
| #113 | PLATINUM | 1.18 | MAGNESIUM | 1.2 | CERIUM | 7.1 | ZSM5 | 100 | 71 | 36 |

FIG.41

| EXAMPLE NO. | RARE METAL | gram/ liter | ADSORBENT A | gram/ liter | ADSORBENT B | gram/ liter | SUBSTRATE | gram/ liter | NOx RELEASE RATE | NOx REDUCTION RATE |
|---|---|---|---|---|---|---|---|---|---|---|
| #114 | PLATINUM | 1.18 | MAGNESIUM | 1.2 | YTTRIUM | 4.5 | ALUMINA | 100 | 72 | 35 |
| #115 | PLATINUM | 1.18 | MAGNESIUM | 1.2 | PRASEODYMIUM | 7.2 | ALUMINA | 100 | 74 | 34 |
| #116 | PLATINUM | 1.18 | MAGNESIUM | 1.2 | NEODYMIUM | 7.4 | ALUMINA | 100 | 72 | 33 |
| #117 | PLATINUM | 1.18 | MAGNESIUM | 1.2 | SAMARIUM | 7.7 | SILICA | 100 | 73 | 35 |
| #118 | PLATINUM | 1.18 | MAGNESIUM | 1.2 | ZIRCONIUM | 4.6 | TITANIA | 100 | 73 | 35 |
| #119 | PLATINUM | 1.18 | MAGNESIUM | 1.2 | MANGANESE | 2.8 | ALUMINA | 100 | 72 | 34 |
| #120 | PLATINUM | 1.18 | MAGNESIUM | 1.2 | IRON | 2.8 | ALUMINA | 100 | 74 | 36 |
| #121 | PLATINUM | 1.18 | MAGNESIUM | 1.2 | NICKEL | 3.0 | β-ZEOLITE | 100 | 74 | 37 |
| #122 | PLATINUM | 1.18 | MAGNESIUM | 1.2 | COBALT | 3.0 | SILICA·ALUMINA | 100 | 75 | 35 |
| #123 | PLATINUM | 1.18 | CALCIUM | 2.0 | STRONTIUM | 4.5 | ALUMINA | 100 | 76 | 33 |
| #124 | PLATINUM | 1.18 | CALCIUM | 2.0 | LANTHANUM | 7.1 | ALUMINA | 100 | 74 | 32 |
| #125 | PLATINUM | 1.18 | CALCIUM | 2.0 | CERIUM | 7.1 | ALUMINA | 100 | 78 | 34 |
| #126 | PLATINUM | 1.18 | CALCIUM | 2.0 | YTTRIUM | 4.5 | ALUMINA | 100 | 74 | 35 |
| #127 | PLATINUM | 1.18 | CALCIUM | 2.0 | PRASEODYMIUM | 7.2 | SILICA | 100 | 75 | 33 |
| #128 | PLATINUM | 1.18 | CALCIUM | 2.0 | NEODYMIUM | 7.4 | TITANIA | 100 | 77 | 34 |
| #129 | PLATINUM | 1.18 | CALCIUM | 2.0 | SAMARIUM | 7.7 | ALUMINA | 100 | 75 | 35 |
| #130 | PLATINUM | 1.18 | CALCIUM | 2.0 | ZIRNONIUM | 4.6 | ALUMINA | 100 | 76 | 31 |
| #131 | PLATINUM | 1.18 | CALCIUM | 2.0 | MANGANESE | 2.8 | ALUMINA | 100 | 76 | 34 |
| #132 | PLATINUM | 1.18 | CALCIUM | 2.0 | IRON | 2.8 | β-ZEOLITE | 100 | 75 | 33 |
| #133 | PLATINUM | 1.18 | CALCIUM | 2.0 | NICKEL | 3.0 | ALUMINA | 100 | 74 | 31 |
| #134 | PLATINUM | 1.18 | CALCIUM | 2.0 | COBALT | 3.0 | ZSM5 | 100 | 78 | 34 |
| #135 | PLATINUM | 1.18 | STRONTIUM | 4.5 | LANTHANUM | 7.1 | ALUMINA | 100 | 74 | 33 |
| #136 | PLATINUM | 1.18 | STRONTIUM | 4.5 | CERIUM | 7.1 | ALUMINA | 100 | 75 | 35 |
| #137 | PLATINUM | 1.18 | STRONTIUM | 4.5 | YTTRIUM | 4.5 | SILICA | 100 | 75 | 36 |
| #138 | PLATINUM | 1.18 | STRONTIUM | 4.5 | PRASEODYMIUM | 7.2 | TITANIA | 100 | 76 | 35 |
| #139 | PLATINUM | 1.18 | STRONTIUM | 4.5 | NEODYMIUM | 7.4 | ALUMINA | 100 | 73 | 34 |
| #140 | PLATINUM | 1.18 | STRONTIUM | 4.5 | SAMARIUM | 7.7 | ALUMINA | 100 | 73 | 33 |
| #141 | PLATINUM | 1.18 | STRONTIUM | 4.5 | ZIRCONIUM | 4.6 | β-ZEOLITE | 100 | 76 | 35 |

FIG.42

| EXAMPLE NO. | RARE METAL | gram/ liter | ADSORBENT A | gram/ liter | ADSORBENT B | gram/ liter | SUBSTRATE | gram/ liter | NOx RELEASE RATE | NOx REDUCTION RATE |
|---|---|---|---|---|---|---|---|---|---|---|
| #142 | PLATINUM | 1.18 | STRONTIUM | 4.5 | MANGANESE | 2.8 | SILICA·ALUMINA | 100 | 74 | 35 |
| #143 | PLATINUM | 1.18 | STRONTIUM | 4.5 | IRON | 2.8 | ALUMINA | 100 | 74 | 34 |
| #144 | PLATINUM | 1.18 | STRONTIUM | 4.5 | NICKEL | 3.0 | ALUMINA | 100 | 75 | 36 |
| #145 | PLATINUM | 1.18 | STRONTIUM | 4.5 | COBALT | 3.0 | ALUMINA | 100 | 73 | 37 |
| #146 | PLATINUM | 1.18 | LANTHANUM | 7.1 | CERIUM | 7.1 | ALUMINA | 100 | 72 | 39 |
| #147 | PLATINUM | 1.18 | LANTHANUM | 7.1 | YTTRIUM | 4.5 | SILICA | 100 | 73 | 37 |
| #148 | PLATINUM | 1.18 | LANTHANUM | 7.1 | PRASEODYMIUM | 7.2 | TITANIA | 100 | 74 | 36 |
| #149 | PLATINUM | 1.18 | LANTHANUM | 7.1 | NEODYMIUM | 7.4 | ALUMINA | 100 | 72 | 38 |
| #150 | PLATINUM | 1.18 | LANTHANUM | 7.1 | SAMARIUM | 7.7 | ALUMINA | 100 | 74 | 39 |
| #151 | PLATINUM | 1.18 | LANTHANUM | 7.1 | ZIRCONIUM | 4.6 | β-ZEOLITE | 100 | 76 | 37 |
| #152 | PLATINUM | 1.18 | LANTHANUM | 7.1 | MANGANESE | 2.8 | ALUMINA | 100 | 74 | 36 |
| #153 | PLATINUM | 1.18 | LANTHANUM | 7.1 | IRON | 2.8 | ZSM5 | 100 | 75 | 37 |
| #154 | PLATINUM | 1.18 | LANTHANUM | 7.1 | NICKEL | 3.0 | ALUMINA | 100 | 72 | 36 |
| #155 | PLATINUM | 1.18 | LANTHANUM | 7.1 | COBALT | 3.0 | ALUMINA | 100 | 74 | 38 |
| #156 | PLATINUM | 1.18 | YTTRIUM | 4.5 | PRASEODYMIUM | 7.2 | ALUMINA | 100 | 73 | 36 |
| #157 | PLATINUM | 1.18 | YTTRIUM | 4.5 | NEODYMIUM | 7.4 | SILICA | 100 | 72 | 35 |
| #158 | PLATINUM | 1.18 | YTTRIUM | 4.5 | SAMARIUM | 7.7 | TITANIA | 100 | 75 | 37 |
| #159 | PLATINUM | 1.18 | YTTRIUM | 4.5 | ZIRCONIUM | 4.6 | ALUMINA | 100 | 71 | 40 |
| #160 | PLATINUM | 1.18 | YTTRIUM | 4.5 | MANGANESE | 2.8 | ALUMINA | 100 | 74 | 38 |
| #161 | PLATINUM | 1.18 | YTTRIUM | 4.5 | IRON | 2.8 | ALUMINA | 100 | 72 | 39 |
| #162 | PLATINUM | 1.18 | YTTRIUM | 4.5 | NICKEL | 3.0 | β-ZEOLITE | 100 | 73 | 35 |
| #163 | PLATINUM | 1.18 | YTTRIUM | 4.5 | COBALT | 3.0 | SILICA·ALUMINA | 100 | 73 | 39 |
| #164 | PLATINUM | 1.18 | PRASEODYMIUM | 7.2 | NEODYMIUM | 7.4 | ALUMINA | 100 | 78 | 35 |
| #165 | PLATINUM | 1.18 | PRASEODYMIUM | 7.2 | SAMARIUM | 7.7 | ALUMINA | 100 | 77 | 34 |
| #166 | PLATINUM | 1.18 | PRASEODYMIUM | 7.2 | ZIRCONIUM | 4.6 | ALUMINA | 100 | 80 | 36 |
| #167 | PLATINUM | 1.18 | PRASEODYMIUM | 7.2 | MANGANESE | 2.8 | SILICA | 100 | 79 | 38 |
| #168 | PLATINUM | 1.18 | PRASEODYMIUM | 7.2 | IRON | 2.8 | TITANIA | 100 | 76 | 34 |
| #169 | PLATINUM | 1.18 | PRASEODYMIUM | 7.2 | NICKEL | 3.0 | ALUMINA | 100 | 78 | 33 |

FIG.43

| EXAMPLE NO. | RARE METAL | gram/liter | ADSORBENT A | gram/liter | ADSORBENT B | gram/liter | SUBSTRATE | gram/liter | NOx RELEASE RATE | NOx REDUCTION RATE |
|---|---|---|---|---|---|---|---|---|---|---|
| #170 | PLATINUM | 1.18 | PRASEODYMIUM | 7.2 | COBALT | 3.0 | ALUMINA | 100 | 77 | 36 |
| #171 | PLATINUM | 1.18 | NEODYMIUM | 7.4 | SAMARIUM | 7.7 | β-ZEOLITE | 100 | 73 | 35 |
| #172 | PLATINUM | 1.18 | NEODYMIUM | 7.4 | ZIRCONIUM | 4.6 | ALUMINA | 100 | 76 | 36 |
| #173 | PLATINUM | 1.18 | NEODYMIUM | 7.4 | MANGANESE | 2.8 | ZSM5 | 100 | 74 | 35 |
| #174 | PLATINUM | 1.18 | NEODYMIUM | 7.4 | IRON | 2.8 | ALUMINA | 100 | 74 | 34 |
| #175 | PLATINUM | 1.18 | NEODYMIUM | 7.4 | NICKEL | 3.0 | ALUMINA | 100 | 75 | 33 |
| #176 | PLATINUM | 1.18 | NEODYMIUM | 7.4 | COBALT | 3.0 | ALUMINA | 100 | 73 | 35 |
| #177 | PLATINUM | 1.18 | SAMARIUM | 7.7 | ZIRCONIUM | 4.6 | SILICA | 100 | 75 | 35 |
| #178 | PLATINUM | 1.18 | SAMARIUM | 7.7 | MANGANESE | 2.8 | TITANIA | 100 | 75 | 34 |
| #179 | PLATINUM | 1.18 | SAMARIUM | 7.7 | IRON | 2.8 | ALUMINA | 100 | 76 | 36 |
| #180 | PLATINUM | 1.18 | SAMARIUM | 7.7 | NICKEL | 3.0 | ALUMINA | 100 | 73 | 33 |
| #181 | PLATINUM | 1.18 | SAMARIUM | 7.7 | COBALT | 3.0 | β-ZEOLITE | 100 | 73 | 32 |
| #182 | PLATINUM | 1.18 | ZIRCONIUM | 4.6 | MANGANESE | 2.8 | SILICA·ALUMINA | 100 | 75 | 37 |
| #183 | PLATINUM | 1.18 | ZIRCONIUM | 4.6 | IRON | 2.8 | ALUMINA | 100 | 76 | 39 |
| #184 | PLATINUM | 1.18 | ZIRCONIUM | 4.6 | NICKEL | 3.0 | ALUMINA | 100 | 74 | 36 |
| #185 | PLATINUM | 1.18 | ZIRCONIUM | 4.6 | COBALT | 3.0 | ALUMINA | 100 | 78 | 40 |
| #186 | PLATINUM | 1.18 | MANGANESE | 2.8 | IRON | 2.8 | ALUMINA | 100 | 74 | 36 |
| #187 | PLATINUM | 1.18 | MANGANESE | 2.8 | NICKEL | 3.0 | SILICA | 100 | 75 | 35 |
| #188 | PLATINUM | 1.18 | MANGANESE | 2.8 | COBALT | 3.0 | TITANIA | 100 | 72 | 38 |
| #189 | PLATINUM | 1.18 | IRON | 2.8 | NICKEL | 3.0 | ALUMINA | 100 | 74 | 37 |
| #190 | PLATINUM | 1.18 | IRON | 2.8 | COBALT | 3.0 | ALUMINA | 100 | 75 | 39 |
| #191 | PLATINUM | 1.18 | NICKEL | 3.0 | COBALT | 3.0 | β-ZEOLITE | 100 | 74 | 38 |

FIG.44

| EXAMPLE NO. | RARE METAL (WITH NOx ADSORBING ABILITY) | gram/ liter | SUBSTRATE | gram/ liter | INLET EXHAUST TEMP. (°C) | ACCENT RATE OF INLET EXHAUST TEMP. (°C/min) | NOx REDUCTION RATE |
|---|---|---|---|---|---|---|---|
| #192 | PALLADIUM | 2.12 | TUNGSTEN OXIDE | 300 | 150 | 150 | 45 |
| #193 | PALLADIUM | 2.12 | TUNGSTEN OXIDE | 300 | 250 | 150 | 50 |
| #194 | PALLADIUM | 2.12 | TUNGSTEN OXIDE | 300 | 150 | 300 | 47 |
| #195 | PALLADIUM | 2.12 | TUNGSTEN OXIDE | 300 | 250 | 300 | 49 |
| #196 | RHODIUM | 2.12 | TUNGSTEN OXIDE | 300 | 150 | 150 | 38 |
| #197 | RHODIUM | 2.12 | TUNGSTEN OXIDE | 300 | 250 | 150 | 40 |
| #198 | RHODIUM | 2.12 | TUNGSTEN OXIDE | 300 | 150 | 300 | 41 |
| #199 | RHODIUM | 2.12 | TUNGSTEN OXIDE | 300 | 250 | 300 | 43 |
| #200 | PLATINUM | 2.12 | TUNGSTEN OXIDE | 300 | 150 | 150 | 46 |
| #201 | PLATINUM | 2.12 | TUNGSTEN OXIDE | 300 | 250 | 150 | 51 |
| #202 | PLATINUM | 2.12 | TUNGSTEN OXIDE | 300 | 150 | 300 | 47 |
| #203 | PLATINUM | 2.12 | TUNGSTEN OXIDE | 300 | 250 | 300 | 52 |
| #204 | IRIDIUM | 2.12 | TUNGSTEN OXIDE | 300 | 150 | 150 | 54 |
| #205 | IRIDIUM | 2.12 | TUNGSTEN OXIDE | 300 | 250 | 150 | 55 |
| #206 | IRIDIUM | 2.12 | TUNGSTEN OXIDE | 300 | 150 | 300 | 55 |
| #207 | IRIDIUM | 2.12 | TUNGSTEN OXIDE | 300 | 250 | 300 | 57 |
| #208 | PALLADIUM | 2.12 | 15mol%TUNGSTEN-ZIRCONIUM | 150 | 150 | 150 | 50 |
| #209 | PALLADIUM | 2.12 | 15mol%TUNGSTEN-ZIRCONIUM | 150 | 250 | 150 | 60 |
| #210 | PALLADIUM | 2.12 | 15mol%TUNGSTEN-ZIRCONIUM | 150 | 150 | 300 | 56 |
| #211 | PALLADIUM | 2.12 | 15mol%TUNGSTEN-ZIRCONIUM | 150 | 250 | 300 | 57 |
| #212 | RHODIUM | 2.12 | 15mol%TUNGSTEN-ZIRCONIUM | 150 | 150 | 150 | 43 |
| #213 | RHODIUM | 2.12 | 15mol%TUNGSTEN-ZIRCONIUM | 150 | 250 | 150 | 50 |
| #214 | RHODIUM | 2.12 | 15mol%TUNGSTEN-ZIRCONIUM | 150 | 150 | 300 | 50 |
| #215 | RHODIUM | 2.12 | 15mol%TUNGSTEN-ZIRCONIUM | 150 | 250 | 300 | 53 |
| #216 | PLATINUM | 2.12 | 15mol%TUNGSTEN-ZIRCONIUM | 150 | 150 | 150 | 51 |
| #217 | PLATINUM | 2.12 | 15mol%TUNGSTEN-ZIRCONIUM | 150 | 250 | 150 | 62 |
| #218 | PLATINUM | 2.12 | 15mol%TUNGSTEN-ZIRCONIUM | 150 | 150 | 300 | 56 |
| #219 | PLATINUM | 2.12 | 15mol%TUNGSTEN-ZIRCONIUM | 150 | 250 | 300 | 58 |
| #220 | IRIDIUM | 2.12 | 15mol%TUNGSTEN-ZIRCONIUM | 150 | 150 | 150 | 59 |
| #221 | IRIDIUM | 2.12 | 15mol%TUNGSTEN-ZIRCONIUM | 150 | 250 | 150 | 65 |
| #222 | IRIDIUM | 2.12 | 15mol%TUNGSTEN-ZIRCONIUM | 150 | 150 | 300 | 62 |
| #223 | IRIDIUM | 2.12 | 15mol%TUNGSTEN-ZIRCONIUM | 150 | 250 | 300 | 63 |

FIG.45

EXHAUST GAS PURIFYING DEVICE

FIELD OF THE INVENTION

This invention relates to the purification of the exhaust gas of an engine or combustion device, and in particular to purification of NOx in exhaust gas with excess oxygen.

BACKGROUND OF THE INVENTION

In a diesel engine or gasoline engine which performs lean burn, good fuel-cost performance is obtained, but it is difficult to purify the nitrogen oxide (NOx) in the exhaust gas as the exhaust gas contains excess oxygen.

In this regard, U.S. Pat. No. 5,473,887 and Tokkai Hei 6-212961 published by the Japanese Patent Office in 1994 disclose a NOx absorber which is disposed in the exhaust gas passage of the engine.

This NOx absorbing material comprises platinum (Pt) and barium (Ba) which are supported on a catalyst substrate.

The NOx absorbing material absorbs NOx when the oxygen concentration of the exhaust gas of the exhaust gas passage is high, and it discharges NOx as the oxygen concentration decreases.

Even in lean exhaust gas, the NOx absorbing material discharges NOx if the degree of leanness falls.

Here, the state where the oxygen concentration of the exhaust gas is higher than the oxygen concentration corresponding to combustion gas from a fuel-air mixture having the stoichiometric air-fuel ratio is referred to as lean, and the state where the oxygen concentration of the exhaust gas is lower than this is referred to as rich.

SUMMARY OF THE INVENTION

The discharged NOx is reduced using a catalyst. However, for this to occur, the oxygen concentration of the exhaust gas must have a value equivalent to the stoichiometric air-fuel ratio, or rich.

Therefore, when the NOx absorption amount of the NOx absorbing material approaches a saturation amount, running at a lean air-fuel ratio must be temporarily interrupted, and the engine must be run at the stoichiometric air-fuel ratio or a rich air-fuel ratio so that the NOx absorbed by the NOx absorbing material can be discharged and reduced. However, if the engine is periodically run at the stoichiometric air-fuel ratio or a rich air-fuel ratio in this way, the advantage of low fuel consumption of a diesel engine or a lean burn gasoline engine is partly lost.

The aforementioned Tokkai Hei 6-212961 also discloses a diesel engine wherein a NOx absorbing material and a hydrocarbon (HC) absorbing material are provided in the exhaust passage.

This diesel engine performs a supplementary fuel injection in the explosion process as NOx is discharged from the NOx absorbing material, and when the exhaust gas temperature rises due to this supplementary injection, the HC absorbing material discharges HC. By using this HC for the reduction of NOx which is discharged from the NOx absorbing material, the NOx reduction efficiency is increased.

However, the HC amount discharged from a diesel engine is less than the NOx discharge amount. Therefore, it is difficult to make the HC absorbing material absorb an HC amount corresponding to the NOx adsorption amount of the NOx absorbing material. If a supplementary injection is performed in order to provide the necessary HC amount, the low fuel consumption advantage of a diesel engine is again partly lost.

It is therefore an object of this invention to efficiently discharge NOx from an NOx absorbing material and efficiently reduce the discharged NOx in an atmosphere wherein excess oxygen is present.

In order to achieve the above objects, this invention provides a device for purifying exhaust gas containing nitrogen oxides in an exhaust passage of a combustion device. The exhaust gas purifying comprises a nitrogen oxide absorbing material which absorbs nitrogen oxides when a reduction component concentration of the exhaust gas is lower than a predetermined concentration, and discharges nitrogen oxides when the reduction component concentration of the exhaust gas is higher than the predetermined concentration, a catalyst which promotes reduction of discharged nitrogen oxides by a reduction component in the exhaust gas, a mechanism for decreasing the reduction component concentration of the exhaust gas, a mechanism for increasing the reduction component concentration of the exhaust gas, and a microprocessor. The microprocessor is programmed to control the decreasing means so that the reduction component concentration of the exhaust gas is less than a first predetermined concentration for a first predetermined time period, and control the increasing means so that the reduction component concentration of the exhaust gas is higher than a second predetermined concentration for a second predetermined time period after the first predetermined time period has elapsed.

The details as well as other features and advantages of this invention are set forth in the remainder of the specification and are shown in the accompanying drawings.

BRIEF DESCRIPTION OF THE DRAWINGS

FIG. 4 is a flowchart describing a subroutine for setting control values for normal running performed by the controller.

FIG. 5 is a flowchart describing a subroutine for decrease setting of a reduction component concentration performed by the controller.

FIG. 6 is a flowchart describing a subroutine for increase setting of the reduction component concentration performed by the controller.

FIG. 13 is a flowchart describing a subroutine for setting control values for normal running according to a second embodiment of this invention.

FIG. 14 is a flowchart describing a subroutine for decrease setting of a reduction component concentration according to the second embodiment of this invention.

FIG. 15 is a flowchart describing a subroutine for increase setting of the reduction component concentration according to the second embodiment of this invention.

FIG. 18 is a flowchart describing a subroutine for setting control values for normal running according to the third embodiment of this invention.

FIG. 19 is a flowchart describing a subroutine for decrease setting of a reduction component concentration according to the third embodiment of this invention.

FIG. 20 is a flowchart describing a subroutine for increase setting of the reduction component concentration according to the third embodiment of this invention.

FIG. 22 is a flowchart describing a subroutine for setting control values for normal running according to the fourth embodiment of this invention.

FIG. 23 is a flowchart describing a subroutine for decrease setting of a reduction component concentration according to the fourth embodiment of this invention.

FIG. 24 is a flowchart describing a subroutine for increase setting of the reduction component concentration according to the fourth embodiment of this invention.

FIG. 26 is a flowchart describing a subroutine for setting control values for normal running according to the fifth embodiment of this invention.

FIG. 27 is a flowchart describing a subroutine for decrease setting of a reduction component concentration according to the fifth embodiment of this invention.

FIG. 28 is a flowchart describing a subroutine for increase setting of the reduction component concentration according to the fifth embodiment of this invention.

FIG. 32 is a flowchart describing a subroutine for setting control values for normal running according to the sixth embodiment of this invention.

FIG. 33 is a flowchart describing a subroutine for decrease setting of a reduction component concentration according to the sixth embodiment of this invention.

FIG. 34 is a flowchart describing a subroutine for increase setting of the reduction component concentration according to the sixth embodiment of this invention.

FIG. 38 is a table showing compositions and characteristics of examples #1–#29 of various catalyst/NOx absorbing material combinations prepared by the inventors.

FIG. 39 is similar to FIG. 38, but showing examples #30–#57.

FIG. 40 is similar to FIG. 38, but showing examples #58–#84.

FIG. 41 is similar to FIG. 38, but showing examples #85–#113.

FIG. 42 is similar to FIG. 38, but showing examples #114–#141.

FIG. 43 is similar to FIG. 38, but showing examples #142–#169.

FIG. 44 is similar to FIG. 38, but showing examples #170–#191.

FIG. 45 is similar to FIG. 38, but showing examples #192–#223.

DESCRIPTION OF THE PREFERRED EMBODIMENTS

Figure 1:
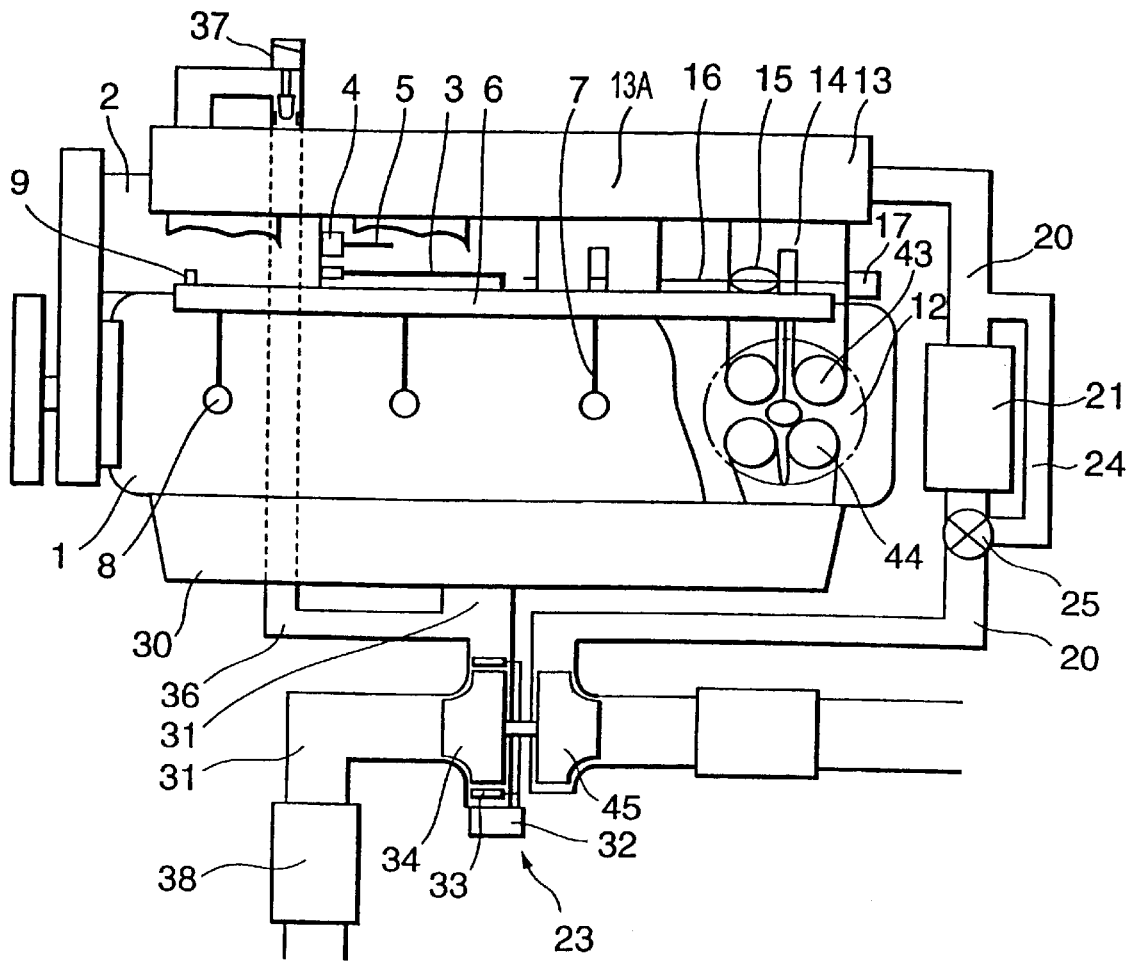
FIG. 1 is a schematic diagram of an exhaust gas purification device of a diesel engine according to this invention.

Referring to FIG. 1 of the drawings, a diesel engine 1 with a series of four cylinders comprises a fuel injection device with a so-called common rail.

The fuel injection device comprises a high pressure pump 2 rotated by the engine 1 which pressurizes fuel aspirated from a fuel tank to a predetermined high pressure. A high pressure fuel pipe 3 is connected via a flow check valve and a fuel return pipe 5 is connected via a solenoid valve 4, respectively, to a discharge port of the high pressure pump 2.

Part of the fuel discharged by the high pressure pump 2 is supplied to a fuel injector 8 via the high pressure fuel pipe 3, common rail 6 and high pressure fuel pipe 7. The remainder of the high pressure fuel returns to the fuel tank through the fuel return pipe 5.

The recirculation amount returned to the fuel tank through the fuel return pipe 5 is determined according to the opening degree of the solenoid valve 4. In other words, the fuel supply amount to the common rail 6 also changes according to the opening degree of the solenoid valve 4. As a result, the fuel pressure in the common rail 6 also varies.

The fuel pressure in the common rail 6 is detected by a pressure sensor 9.

Next, describing the intake air system of the engine 1, the engine 1 comprises two intake valves 43 and two exhaust valves 44 in each cylinder. Intake air in an intake passage 20 is led to the intake valves 43 through an intake manifold 13.

The intake manifold 13 comprises a collector 13A, and multiple branch pipes 14 extending from the collector 13A to each intake valve 43. A pair of the branch pipes 14 are respectively connected to the pair of intake valves 43 in each cylinder, and one of the branch pipes 14 of each pair is provided with a swirl control valve 15.

The swirl control valve 15 is driven by an actuator 17 through a valve shaft 16. The swirl control valve 15 increases the deviation between the flowrates of the pair of branch pipes 14 as its opening degree becomes smaller, thereby setting up a strong swirl in a combustion chamber 12.

A compressor 45 of a turbocharger 23 is connected to the intake passage 20, and an intercooler 21 is provided in the middle of the intake passage 20. The intercooler 21 cools the temperature of intake air which was raised by the supercharging of the turbocharger 23, and improves the air charging efficiency of the combustion chamber 12. The intercooler 21 may be an air cooling type or a water cooling type.

A bypass passage 24 which bypasses the intercooler 21 is attached to the intake passage 20. A bypass control valve 25 is provided in a branch of the bypass passage 24 from the intake passage 20 upstream of the intercooler 21 so as to increase or decrease the bypass air flowrate of the bypass passage 24. The temperature of the air in the collector 13A increases the larger the bypass air amount.

Next, the exhaust system of the engine 1 will be described.

An exhaust manifold 30 is connected to an exhaust valve 44 of the engine 1. Exhaust gas collected in the exhaust manifold 30 is discharged by an exhaust passage 31. An exhaust gas turbine 34 of the turbocharger 23 is provided in the middle of the exhaust passage 31 and a catalytic converter 38 is also provided further downstream in the exhaust passage 31.

The turbocharger 23 is an adjustable nozzle type turbocharger. A nozzle vane actuator 32 varies the angle of the exhaust gas striking the exhaust gas turbine 34 and varies the charging pressure by varying the angle of nozzle vanes 33.

It is also possible to vary the charging pressure by providing a bypass passage which bypasses the exhaust gas turbine 34, and varying the exhaust gas flowrate in this bypass passage.

An exhaust gas recirculation passage 36 branches from the exhaust passage 31 upstream of the exhaust gas turbine 34.

The exhaust gas recirculation passage 36 recirculates part of the exhaust gas in the exhaust passage 31 to the collector 13. An exhaust gas recirculation control valve 37 is interposed in the exhaust gas recirculation passage 36 to control this recirculation flowrate.

The catalytic converter 38 has the functions of absorbing the nitrogen oxide (NOx) in the exhaust gas when the reduction component concentration of the exhaust gas is low, and discharging NOx when the reduction component concentration of the exhaust gas is high. The catalytic converter 38 also has a function to reduce the discharged NOx.

The catalytic converter 38 houses a catalyst/NOx absorbing material comprising a coating layer comprising platinum (Pt) which is a catalytic noble metal and barium (Ba) which is an NOx absorbing material, and an alumina substrate having a honeycomb-like cross-section which supports the coating layer.

This type of a catalyst/NOx absorbing material provides the above-mentioned catalyst function and NOx absorbing function.

Figure 2:
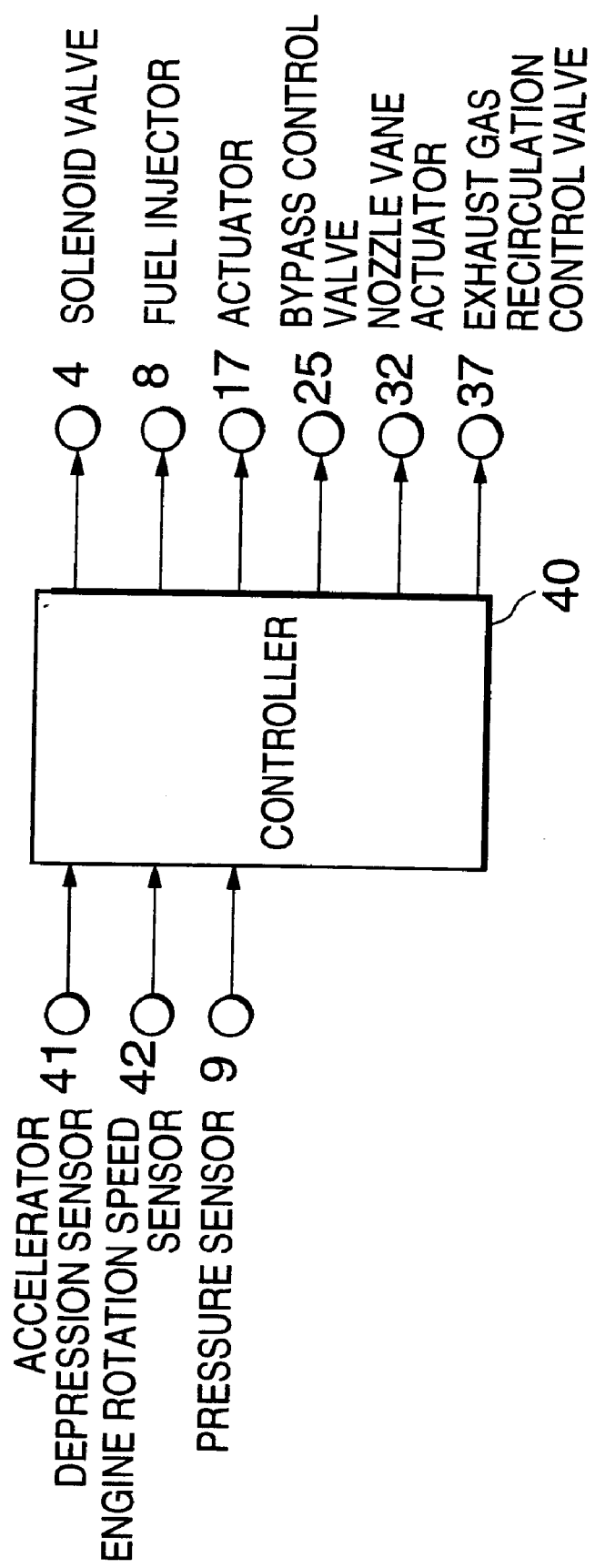
FIG. 2 is a diagram describing input and output signals of a controller provided to the exhaust gas purification device.

Next, the control system of an engine 1 will be described referring to FIG. 2.

The control system of the engine 1 comprises a controller 40. The controller 40 comprises a microcomputer equipped with a central processing unit (CPU), read only memory (ROM), random access memory (RAM) and input/output interface (I/O interface).

An accelerator depression degree Acc detected by a accelerator depression sensor 41, engine rotation speed Ne detected by an engine rotation speed sensor 42, and fuel pressure P detected by a pressure sensor 9, are input as signals to the controller 40.

Based on these input signals, the controller 40 outputs signals to the solenoid valve 4, fuel injector 8, swirl control valve actuator 17, bypass control valve 25, nozzle vane actuator 32 and exhaust gas recirculation control valve 37 to control these actuators and valves.

When the NOx adsorption amount of the catalyst/NOx absorbing material reaches a predetermined level, the controller 40 increases or decreases the concentration of the reduction components in the exhaust gas by this control. That is, the reduction component concentration is first decreased over a first elapsed time, and is then increased over a second elapsed time.

The reason for this will now be described

The absorption and discharge of NOx of the catalyst/NOx absorbing material using, for example, platinum (Pt) and magnesium (Mg) is considered to occur by the following mechanism. NOx in the exhaust gas of an engine or a combustion device is almost all inactive NO. If the exhaust gas contains an excess of oxygen, oxygen in the exhaust gas will be absorbed on the surface of the platinum (Pt) to become an active oxygen species, and this active oxygen species will oxidize inactive NO to active $NO_2$. The $NO_2$ formed is chemically absorbed by the magnesium (Mg), and converted to nitrate ion ($NO_3^-$) on the magnesium (Mg).

As the oxygen in the exhaust gas is used for this absorption, the absorption rate is higher the higher the oxygen concentration of the exhaust gas.

At the same time, the $NO_3^-$ formed also decomposes into NO, $NO_2$ and $O_2$. The rate of this decomposition is higher the larger the amount of $NO_3^-$, formed, i.e., the larger the NOx absorption amount of the catalyst/NOx absorbing material.

The NO, $NO_2$ and $O_2$ produced by the decomposition are discharged in the exhaust gas, and they increase the oxygen concentration of the exhaust gas. The rate of the decomposition is therefore smaller the higher the oxygen concentration.

As a result of these reactions, the amount of NOx which can be absorbed and retained by the catalyst/NOx absorbing material is equal to the NOx amount when the absorption and decomposition/discharge are in equilibrium. This amount will be referred to hereafter as the equilibrium NOx absorption amount.

When the oxygen concentration is high, the absorption rate is high and the decomposition rate is low, so the equilibrium NOx absorption amount is large.

Conversely, when the oxygen concentration is low, the absorption rate is low and the decomposition rate is high, so the equilibrium NOx absorption amount is small.

Therefore, while the oxygen concentration is high and the NOx absorption amount is less than the equilibrium NOx absorption amount, NOx is absorbed, and when the oxygen concentration decreases so that the equilibrium NOx absorption amount becomes less than the NOx absorption amount, the excess NOx is discharged. Results of experiments performed by the inventors using a catalyst of platinum (Pt) and magnesium (Mg) as to whether or not such an NOx absorption-discharge cycle always holds, are shown in FIG. 35.

In this experiment, the oxygen concentration was decreased by a fixed value of 2.5% from various oxygen concentration values, and the relation between the oxygen concentration after the decrease and NOx discharge amount was studied.

Figure 35:
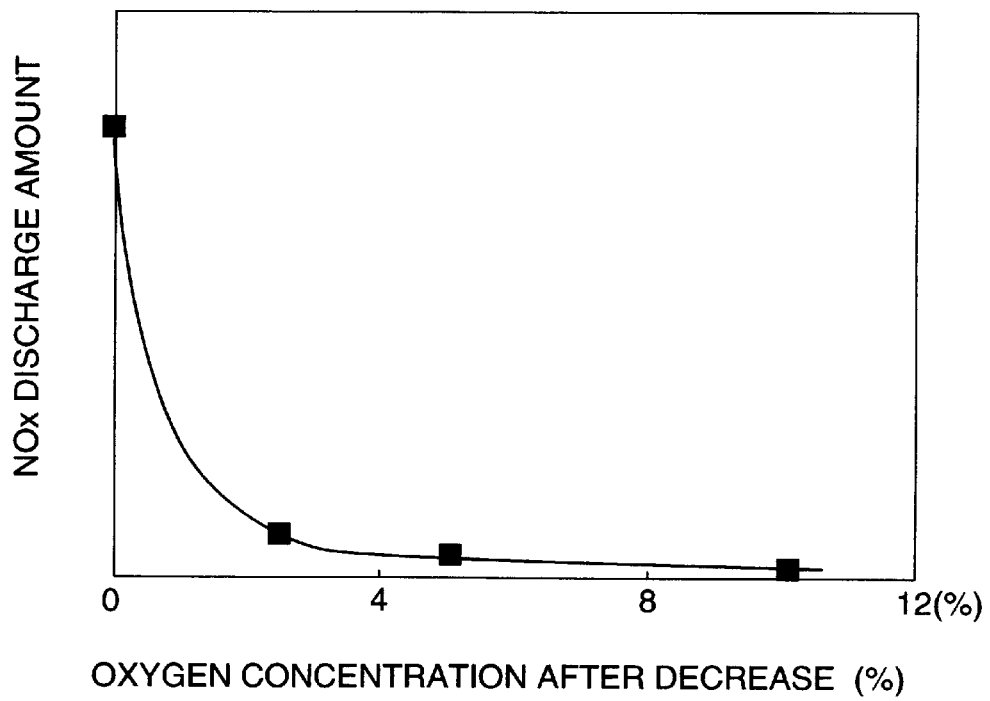
FIG. 35 is a diagram showing a relation between a minimum oxygen concentration and NOx discharge amount obtained by experiment by the inventors.

The horizontal axis of the graph of FIG. 35 represents the oxygen concentration after the decrease and the vertical axis represents the NOx discharge amount.

As a result of this experiment, it was found that when the oxygen concentration after the decrease is 0%, i.e., when NOx is absorbed at an oxygen concentration of 2.5% and discharged at 0%, a large amount of NOx is discharged, but when the minimum oxygen concentration is 3%, i.e., when NOx is absorbed at an oxygen concentration of 5.5% and discharged at 3%, the amount of discharged NOx sharply decreases.

Further, it was found that when the oxygen concentration after the decrease reached 4.5% or higher, almost no NOx was discharged.

The reason for this may be that when the oxygen concentration is 4.5% or higher, the formation of active oxygen species on Pt is saturated, and even if the oxygen concentration is further increased, the equilibrium NOx absorption amount no longer varies.

This invention achieves the NOx absorption-discharge cycle under such excess oxygen conditions based on the following studies.

The active oxygen species formed on Pt not only oxidizes NO to $NO_2$, but also oxidizes hydrocarbons (HC) and carbon monoxide (CO) which are reduction components of the exhaust gas. Therefore, when the reduction component concentration of the exhaust gas is high, fewer active oxygen species contribute to the NO oxidation than in the case where the reduction component concentration is low, and the NOx absorption rate of the catalyst/NOx absorbing material decreases.

As a result, the equilibrium NOx absorption amount of the catalyst/NOx absorbing material is large when the reduction component concentration is low, and small when the reduction component concentration is high. This means that the catalyst/NOx absorbing material absorbs NOx while the reduction component concentration is low and the NOx absorption amount is less than the equilibrium NOx absorption amount, and discharges excess NOx when the reduction component concentration is increased and the equilibrium NOx absorption amount is less than the NOx absorption amount. This NOx discharge occurs due to a decrease of the absorption rate. The decomposition rate at this time does not vary much, and the decomposition of excess NOx proceeds comparatively slowly.

For this reason, $NO_3^-$ which has strong adsorption characteristics tends to stay on the Pt surface longer than NO and $NO_2$, so the probability that $NO_3^-$ will encounter reduction components in the exhaust gas on Pt increases.

Therefore, part of the excess NOx which should be discharged is reduced on Pt before discharging into the exhaust gas.

A NOx absorption-discharge reduction cycle due to such a mechanism may always occur when the equilibrium NOx absorption amount of the catalyst/NOx absorbing material varies due to the reduction component concentration flowing into the catalytic converter. However, according to research carried out by the inventors, if the reduction component concentration is first decreased before increasing the reduction component concentration, discharge of NOx when the reduction component concentration increases is promoted.

It was also found that, in this case, the NOx discharge may actually exceed the excess. That is, when the reduction component concentration is increased, although the NOx absorption amount of the catalyst/NOx absorbing material is less than the equilibrium NOx absorption amount at that time, the discharge of NOx may continue. The inventors suggest that this may be due to a rapid change in the surface state of the catalyst/NOx absorbing material.

Next, the results of an experiment performed by the inventors on the effect of the variation of reduction component concentration on the NOx discharge rate will be described referring to FIG. 36. This figure shows the NOx discharge rate in the case where the reduction component concentration is once decreased and then increased to a fixed value of 500 ppm or higher. The decrease of the reduction component concentration is performed in a absorption stage of NOx and increase of the reduction component concentration to the fixed value is performed in a discharge stage of NOx. Herein, the NOx absorbing stage denotes a state where the NOx adsorption by the catalyst/NOx absorbing material is superior to the NOx discharge by the same whereas the NOx discharge stage denotes a state where the NOx discharge by the catalyst/NOx absorbing material is superior to the NOx adsorption by the same.

The rate of NOx discharge is defined as follows. The NOx discharge rate is defined as $$\frac{B}{A} \cdot 100\, (\%),$$

if the equilibrium NOx absorption amount when the reduction component concentration is zero is A, and the NOx amount which is discharged or reduction purified by discharge processing is B. As is clear from this diagram, when the reduction component concentration in the absorption stage falls to or below a predetermined concentration, the NOx discharge rate in the discharge stage largely increases, and when the reduction component concentration in the absorption stage reaches a predetermined concentration or higher, the NOx discharge rate in the discharge stage decreases. The inventors consider that the reason for this may be due to the fact that when the reduction component concentration reaches a predetermined concentration or higher, the reaction of the reduction components with active oxygen species on Pt finally reaches saturation, and even if the reduction component concentration is varied above the predetermined concentration, the equilibrium NOx absorption amount no longer varies.

Figure 36:
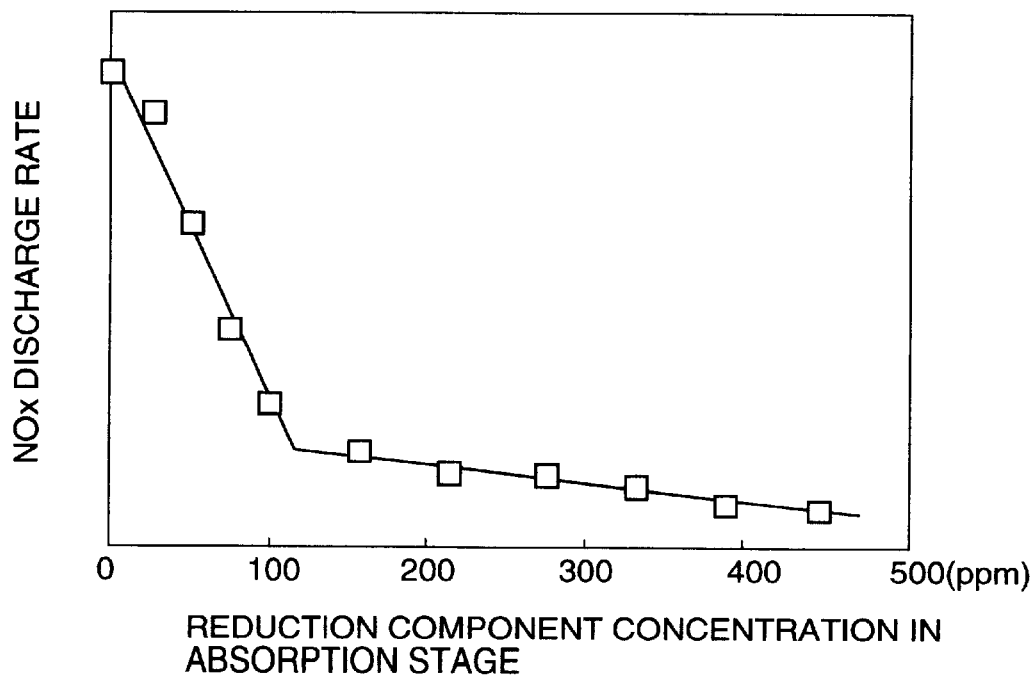
FIG. 36 is a diagram showing a relation between a reduction component concentration in a NOx absorption stage and NOx discharge amount in a NOx discharge stage obtained by experiment by the inventors.

In the experiment of FIG. 36, a Pt—Mg catalyst/NOx absorbing material is used and the aforesaid predetermined concentration at which the NOx discharge rate characteristics vary is near 100 ppm. This value may vary somewhat depending on the type of catalyst metal or the support amount, but if a platinum type metal is used as catalyst on the support, essentially identical characteristics to those of FIG. 36 will probably be observed. In the above experiment, the reduction component concentration is decreased in the NOx adsorption stage, but since NOx absorption and NOx discharge are performed simultaneously in reality, the same results are obtained in the case where both decrease of the reduction component concentration and the increase thereof are performed in the NOx discharge stage.

Figure 37:
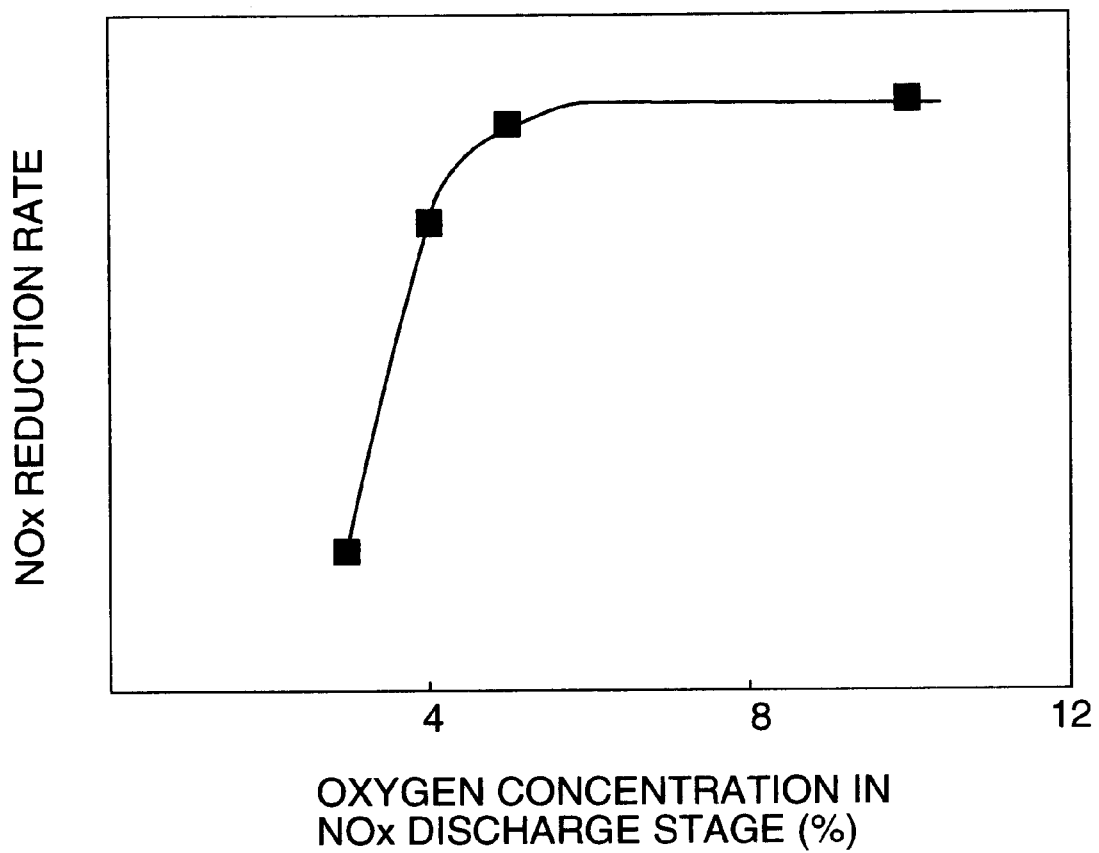
FIG. 37 is a diagram showing a relation between an oxygen concentration and NOx decrease rate obtained by experiment by the inventors.

Next, FIG. 37 shows the result of an experiment carried out by the inventors on the effect of oxygen concentration on the NOx discharge. This diagram shows the relation of oxygen concentration and the NOx reduction rate when the reduction component concentration is held at or below 100 ppm, and the reduction component concentration is then increased to a fixed concentration of 200 ppm or more. The NOx reduction rate is defined as $$\frac{A3}{A1+A2+A3} \cdot 100 \ (\%)$$

when the NOx amount newly flowing into the catalyst/NOx absorbing material during discharge is A1, the NOx amount discharged as NO, $NO_2$ from the catalyst/NOx absorbing material is A2, and the NOx amount reduced and purified to $N_2$ by the catalyst/NOx absorbing material is A3.

As is clear from this diagram, when the oxygen concentration becomes lower than 4.5% in the discharge stage, the NOx reduction rate falls off sharply. This is considered to be due to the fact that when the oxygen concentration falls below 4.5%, the $NO_3^-$ decomposition reaction rate abruptly increases, $NO_3^-$ is rapidly decomposed into NO or $NO_2$, and NO, $NO_2$ which have a weaker adsorption than $NO_3^-$ are quickly discharged in the exhaust gas. Once NOx has been discharged into the exhaust gas, it is almost never reduced to $N_2$ in an excess oxygen atmosphere.

Now, the control of the actuators and valves performed by the controller 40 based on the above analysis will be described referring to the flowcharts of FIGS. 3–6.

Figure 3:
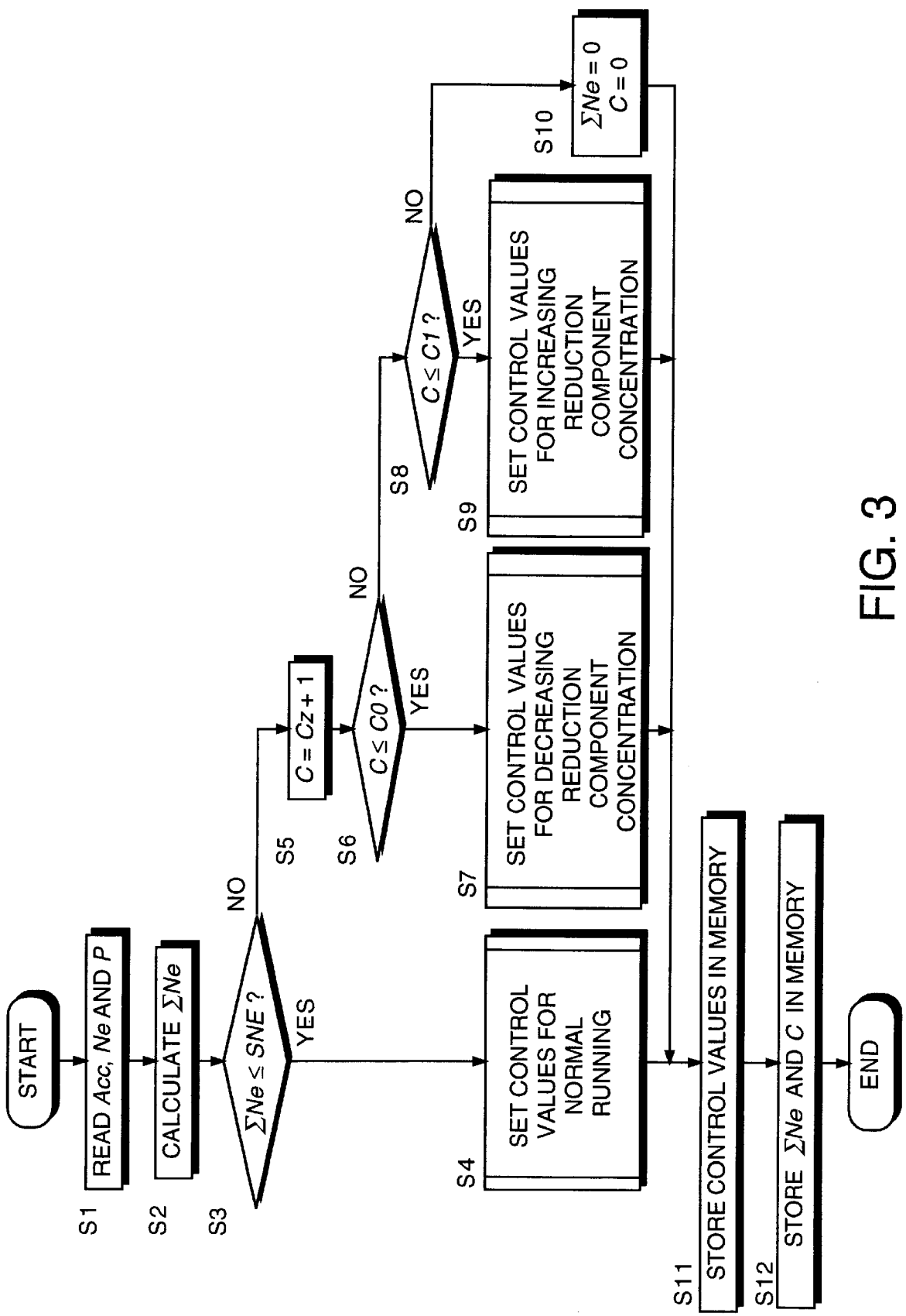
FIG. 3 is a flowchart describing an engine control routine performed by the controller.

FIG. 3 shows the main engine control routine. This routine is performed at an interval of, e.g., 10 milliseconds.

This main routine determines the opening degree of the solenoid valve 4, the fuel injection pulse width of the fuel injector 8, etc., and the actuators and valves are controlled by other routines using the determined values.

First, in a step S1, the controller 40 reads the accelerator depression degree Acc, rotation speed Ne, and fuel pressure P of the common rail 6.

In a step S2, a cumulative value ΣNe of the engine rotation speed is calculated. This is done by adding the engine speed Ne to the cumulative value ΣNe on the immediately preceding occasion the routine was executed. The initial value of the cumulative value ΣNe when this routine is first performed immediately after the engine startup is zero.

This cumulative value ΣNe is a parameter showing the absorption amount of nitrogen oxides (NOx) in the exhaust gas which the catalyst/NOx absorbing material absorbed. The amount of NOx absorbed by the catalyst/NOx absorbing material is directly proportional to the flowrate of exhaust gas from the engine 1, and the NOx concentration of the exhaust gas.

More correctly, it is proportional to the engine rotation speed Ne and the engine load. Here, the engine load may be expressed by the accelerator depression degree Acc. Therefore, the NOx absorption amount may be estimated by summing the product of the engine rotation speed Ne and accelerator depression amount Acc.

In this embodiment, the above-mentioned relation may be simplified by using the cumulative value ΣNe of the rotation speed as a representative value for the NOx absorption amount.

In a step S3, it is determined whether or not the cumulative value ΣNe is below a predetermined value SNE. The predetermined value SNE is set to a value corresponding to, for example, 50% of the NOx absorption capacity of the catalyst/NOx absorbing material. Therefore, when the cumulative value ΣNe is equal to or less than the predetermined value SNE, it implies that the NOx absorption amount is 50% or less of NOx absorption capacity. In this case, the controller 40 sets control values for normal running in a step S4, considering that the engine is operating in the normal running state. Here, control values means the seven values, fuel injection pulse width T, fuel injection timing IT, target fuel pressure TP, target opening TS of the swirl control valve 15, target flowrate distribution TB between total intake air flowrate and flowrate of the bypass passage 24, target exhaust gas recirculation rate TE, and target nozzle angle TN of the adjustable nozzle type turbocharger 23. The fuel injection pulse width T means the width of the pulse signal sent to the fuel injector 8. The fuel injector 8 maintains a fuel injection for a time equivalent to this pulse width. Therefore, the fuel injection pulse width T is a value corresponding to a fuel injection amount. The specific methods of setting these control values will be described later.

In the step S4, the control values are determined based on the running conditions of the engine 1 so that the discharge amounts of hydrocarbons (HC), NOx and particulate matter (PM) are small on average, and fuel consumption and engine output characteristics are also good.

When the cumulative value ΣNe is larger than the predetermined value SNE in the step S3, a counter value C is incremented in a step S5. Specifically, 1 is added to a counter value Cz on the immediately preceding occasion when the routine was executed.

Here, the counter value C shows an elapsed time from when the NOx absorption amount of the catalyst/NOx absorbing material exceeds 50%. Therefore, the actual elapsed time may be calculated by multiplying the counter value by 10 milliseconds, which is the execution interval of the routine.

In a following step S6, the counter value C is compared with a first predetermined value $C_0$. When the counter value C is equal to or less than the first predetermined value $C_0$, the routine proceeds to a step S7. When the counter value C is larger than the predetermined value $C_0$, the routine proceeds to a step S8.

In a step S7, setting of control values for decreasing the reduction component concentration is performed. This setting method will be described later. As a result of this processing, within the first elapsed time, i.e., $C_0 \cdot 10$ milliseconds after the NOx absorption amount of the catalyst/NOx absorbing material exceeds 50%, control to decrease the reduction component concentration of the exhaust gas is performed. Specifically, the HC concentration of the exhaust gas is set to 100 ppm or less, for example. Also, the first elapsed time is set to, for example, 10 seconds. The value of $C_0$ in this case is 1,000.

In a step S8, the counter value C is compared with a second predetermined value $C_1$. When the counter value C is equal to or less than a second predetermined value $C_1$, the routine proceeds to a step S9. When the counter value C is larger than the second predetermined value $C_1$, the routine proceeds to a step S10.

In a step S9, control values for increasing the reduction component concentration are set. This setting method is described later. As a result of this processing, after the first elapsed time has elapsed from when the NOx absorption amount of the catalyst/NOx absorbing material exceeded 50% as starting point, control is performed to increase the reduction component concentration of the exhaust gas while a second time period, i.e., $(C_1-C_0)\cdot 10$ milliseconds, elapses. Specifically, the HC concentration of the exhaust gas is set to 200 ppm or higher, for example. The second elapsed time is taken as the time for the catalyst/NOx absorbing material to completely discharge NOx. The second elapsed time is set to, for example, 10 seconds.

In this case, therefore, C1=C0+1000.

The routine proceeds to the step S10 after the engine has been run while decreasing the reduction component concentration and when it has been run after increasing the reduction components. In this case, it is considered that the discharge of NOx from the catalyst/NOx absorbing material is already complete, ΣNe which is a parameter of the NOx absorption amount is reset to 0, and the counter value C is also reset to 0.

After the processing of any of the steps S4, S7, S9 and S10 is complete, the routine proceeds to a step S11.

Here, the control values set in the step S4, S7 or S9 are stored in a memory in the controller 40. As mentioned above, although this routine determines control values, the control of the actuators and valves using the determined control values is performed by other control routines. The reason why the determined control values are stored in memory is to transfer them to these control routines.

Finally, the cumulative value ΣNe and counter value C are stored in the memory of the controller 40 in a step S12 for the next occasion the routine is executed, and the routine is terminated.

By executing the above routine at a fixed interval, when the NOx absorption amount of the catalyst/NOx absorbing material reaches a predetermined amount during normal running, the reduction component concentration in the exhaust gas is first reduced, and is then increased.

Next, a subroutine for setting the control values for normal running applied in the step S4 of FIG. 3 will be described referring to FIG. 4.

First, in a step S401, a fuel injection amount Q is calculated by looking up a fuel injection amount map for normal running prestored in the controller 40, based on the accelerator depression degree Acc and the engine rotation speed Ne which were read in the step S1. This map comprises numerous ranges according to the accelerator depression degree Acc and the engine rotation speed Ne, and the fuel injection amount Q is set for each of these ranges. In a step S402, the fuel injection pulse width T is computed based on the fuel injection amount Q and the fuel pressure P read in the step S1. The fuel amount injected from the fuel injector 8 is directly proportional to the valve opening time of the fuel injector 8, and the proportionality constant is determined by the fuel pressure of the common rail 6. Therefore, the fuel injection amount Q may be converted to the fuel injection pulse width T by substituting the fuel injection amount Q and fuel pressure P into a predetermined equation.

Figure 7:
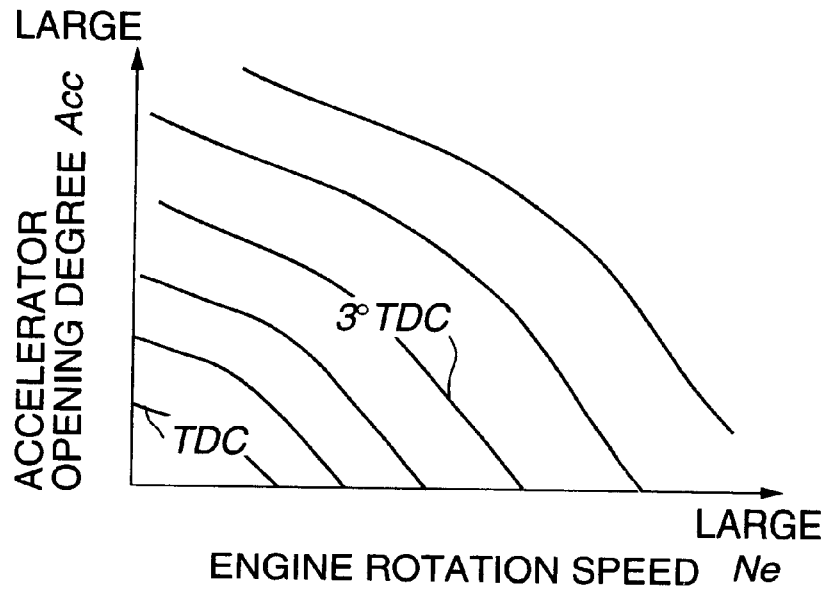
FIG. 7 is a map of a basic fuel injection timing for normal running stored by the controller.

In a step S403, a fuel injection timing IT is calculated by looking up a fuel injection timing map for normal running prestored in the controller 40 based on the accelerator depression degree Acc and the engine rotation speed Ne. This map sets the fuel injection timing IT according to the accelerator depression degree Acc and the engine rotation speed Ne, as shown in FIG. 7. In this map, TDC means Top Dead Center in the compression stroke of an engine piston. Also, 3° TDC means 3 degrees before TDC.

In a step S404, the target fuel pressure TP in the common rail 6 is calculated by looking up a fuel pressure map for normal running prestored in the controller 40 based on the accelerator depression degree Acc and the engine rotation speed Ne. The target fuel pressure TP may also be set to fixed value.

In a step S405, the target opening TS of the swirl control valve 15 is calculated by looking up a swirl control valve opening map for normal running prestored in the controller 40 based on the accelerator depression degree Acc and the engine rotation speed Ne.

In a step S406, the target flowrate distribution TB between the total intake air flowrate and the flowrate in the bypass passage 24 is set to 0. Due to this, the total amount of intake air is made to pass through the intercooler 21 during normal running.

In a step S407, the target exhaust gas recirculation rate TE is calculated by looking up an exhaust gas recirculation rate map for normal running prestored in the controller 40 based on the accelerator depression degree Acc and the engine rotation speed Ne.

In a step S408, the target nozzle angle TN of the turbocharger 23 is calculated by looking up a nozzle angle map for normal running prestored in the controller 40 based on the accelerator depression degree Acc and the engine rotation speed Ne.

In the following description, the case where the exhaust gas which strikes the exhaust gas turbine 34 approaches from a tangential direction to the exhaust gas turbine 34 will be referred to by the expression that the opening of the nozzle vanes 33 is large or the nozzle angle is large. Therefore, the larger the target nozzle angle TN, the closer the direction of the exhaust gas to the tangential direction to the exhaust gas turbine 34 which raises the charging pressure.

In the maps looked up in the steps S401 to S408, the control values are set so that discharge of hydrocarbons (HC), NOx and particulate matter (PM) is low on average, and fuel consumption and engine output characteristics are good, as mentioned above.

Next, a subroutine which sets various control values for decreasing the reduction component concentration applied in the step S7 of FIG. 4 will be described referring to FIG. 5.

Of steps S701–S708 of this subroutine, the same processes are applied in steps S701, S702, S704, S705, S706 and S708 as in the steps S401, S402, S404, S405, S406 and S408 of FIG. 4 respectively, and control values are calculated using the same maps. That is, the differences between the subroutines of FIG. 5 and FIG. 4 are only the steps S703 and S707.

In the step S703, a value obtained by adding a predetermined advance correction value ITA to the fuel injection timing looked up using the same map as that of the step S403, is set as the fuel injection timing IT. The advance correction value ITA is set to, for example, 3 degrees.

Figure 8:
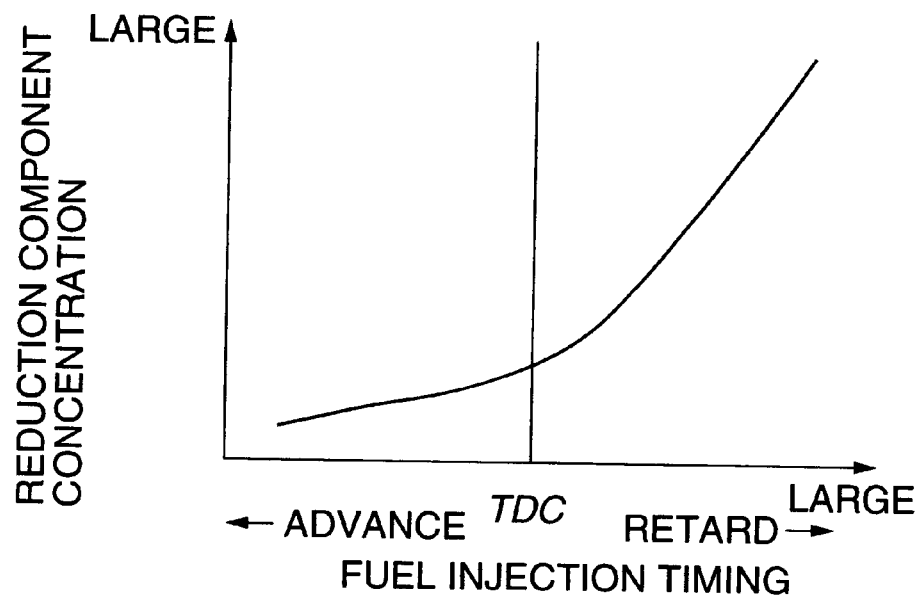
FIG. 8 is a diagram showing a relation of a fuel injection timing and the reduction component concentration.

In a diesel engine, the HC concentration of the exhaust gas generally decreases the more the fuel injection timing is advanced, as shown in FIG. 8. Therefore, in this step 703, in order to decrease the reduction component concentration, the fuel injection timing is advanced more than in normal running.

Instead of correcting the basic fuel injection timing using an advance correction value, a map which directly gives an advanced fuel injection timing for decreasing the reduction component concentration may of course also be used.

In the step S707, a value obtained by subtracting a predetermined decrease correction value ED from the target exhaust gas recirculation rate looked up using the same map as in the step S407, is set to the target exhaust gas recirculation rate TE.

Figure 9:
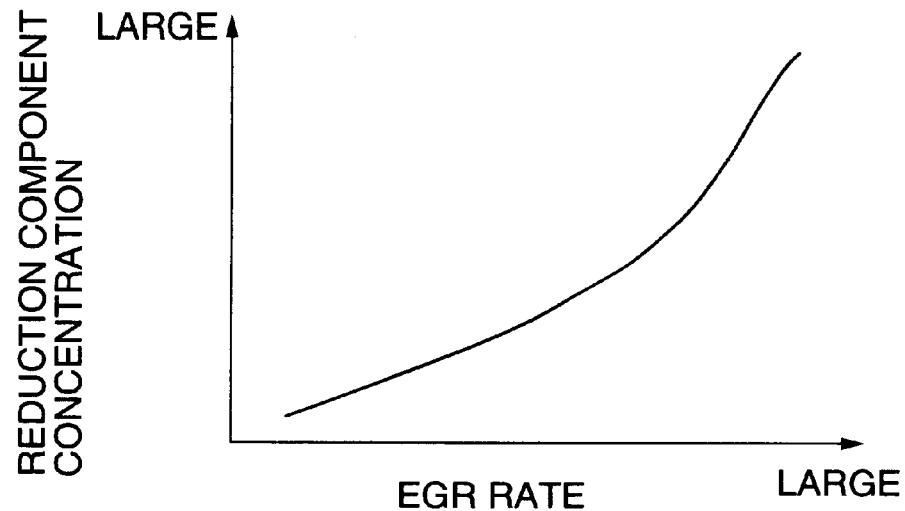
FIG. 9 is a diagram showing a relation between exhaust gas recirculation rate and the reduction component concentration.

In a diesel engine, the HC concentration of the exhaust gas is generally lower, the lower the exhaust gas recirculation (EGR) rate as shown in FIG. 9. Therefore, in this step S707, a correction is applied to decrease the target exhaust gas recirculation rate so as to decrease the reduction component concentration.

According to the method wherein a fixed value is subtracted from a value calculated from the normal running map as described above, the decrease of HC concentration or variation of exhaust gas characteristics other than HC will always be shifted by fixed amounts in comparison to normal running. The HC concentration may also be decreased by simply setting the target exhaust gas recirculation rate TE to 0.

According to this embodiment, the HC concentration of exhaust gas is reduced by advancing the fuel injection timing and by decreasing the exhaust gas recirculation rate, but as the HC concentration of diesel engine exhaust is already low, the HC concentration of the exhaust gas may be decreased to 100 ppm or less by applying either of these corrections alone.

However, since the lower the HC concentration, the more efficient the subsequent NOx discharge, it is desirable to perform both corrections simultaneously if possible. It should be noted that when the fuel injection timing is advanced or the exhaust gas recirculation rate is decreased, there may be some undesirable effect on engine characteristics apart from the HC discharge amount, but as the reduction component concentration is decreased only during the first elapsed time, this is not a practical problem.

Next, a subroutine for setting control values for increasing the reduction component concentration applied in the step S9 of FIG. 3 will be described referring to FIG. 6.

In this embodiment, even in the case where the reduction component concentration of the exhaust gas is increased, the fuel injection amount is arranged to be the same as that for normal running. In other words, the processing of steps S901 and S902 and the maps used therein are identical to those of the steps S401 and S402. For this reason, even if running of the engine 1 to increase the reduction component concentration is performed, there is no large increase of fuel consumption of the engine 1, and the operating performance of the engine is not impaired.

In a step S903, a value obtained by subtracting a predetermined retardation correction value ITR from the fuel injection timing looked up using the same map as that of the step S403, is set as the fuel injection timing IT. The retardation correction value is set to, for example, 3 degrees. If the fuel injection timing IT after subtraction is a negative value, fuel injection will be performed after top dead center in the compression cycle.

In a diesel engine, the HC concentration of the exhaust gas generally increases the more the fuel injection timing is retarded, as shown in FIG. 8. Therefore, in the step S903, to increase the reduction component concentration, the fuel injection timing is retarded compared to normal running.

Further, the HC concentration increase due to retardation of fuel injection timing is not accompanied by a decrease of the oxygen concentration of the exhaust gas. Therefore, the decomposition discharge rate of NOx (NO$_3^-$) absorbed by the catalytic converter 38 does not increase due to this process, and a good NOx reduction efficiency is obtained.

Instead of correcting the basic fuel injection timing using a retardation correction value, a map which directly gives a retarded fuel injection timing for increasing the reduction component concentration may of course also be used.

In a step S904, a value obtained by subtracting a predetermined decrease correction value PD from the target fuel pressure calculated using the same map as that of the step S404, is set to the target fuel pressure TP. In general, this is because the HC concentration of the exhaust gas increases the lower the fuel pressure. The HC concentration increase due to fuel pressure decrease is not accompanied by a decrease of the oxygen concentration of the exhaust gas. The target fuel pressure TP may also be set to a fixed value, and the fixed value may be set to a value smaller than the fixed value during normal running.

In a step S905, the target opening TS of the swirl control valve 15 is calculated by looking up a target opening map for increasing reduction component concentration prestored in the controller 40, based on the accelerator depression degree Acc and the engine rotation speed Ne. In a diesel engine, if the opening degree of the swirl control valve 15 is changed to vary the swirl intensity in the combustion chamber 12, the HC concentration of the exhaust gas will generally vary. However, as the relation between increased swirl and HC concentration is not uniform, a swirl control valve opening map for increasing the reduction component concentration, which is different from the control map used for normal running, is used to calculate the target opening TS.

Figure 10:
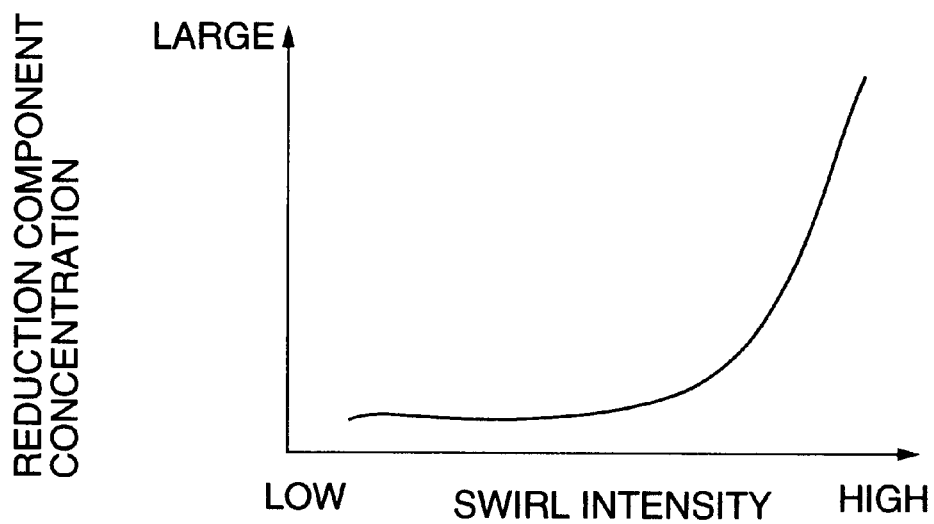
FIG. 10 is a diagram showing a relation of swirl intensity and the reduction component concentration.

In the case of a diesel engine which mainly performs premixing combustion, when swirl is intensified, the HC concentration increases regardless of running conditions as shown in FIG. 10. Therefore, in this type of diesel engine, the target opening TS for reduction component concentration increase may be set by adding a predetermined decrease correction to a value calculated using the normal running map. Alternatively, the increase of HC concentration may be achieved merely by setting the target opening TS to 0. However, if the swirl control valve 15 is fully closed, the oxygen concentration of the exhaust gas may decrease a little due to the decrease of the intake air amount.

In a step S906, the target flowrate distribution TB between total intake air flowrate and flowrate of the bypass passage 24 is set to a predetermined value BI. Here, the predetermined value BI is a value from 0% to 100%. In other words, part or all of the intake air amount bypasses the intercooler 21.

The intake air temperature increases the more the proportion of intake air which bypasses the intercooler 21 increases.

Figure 11:
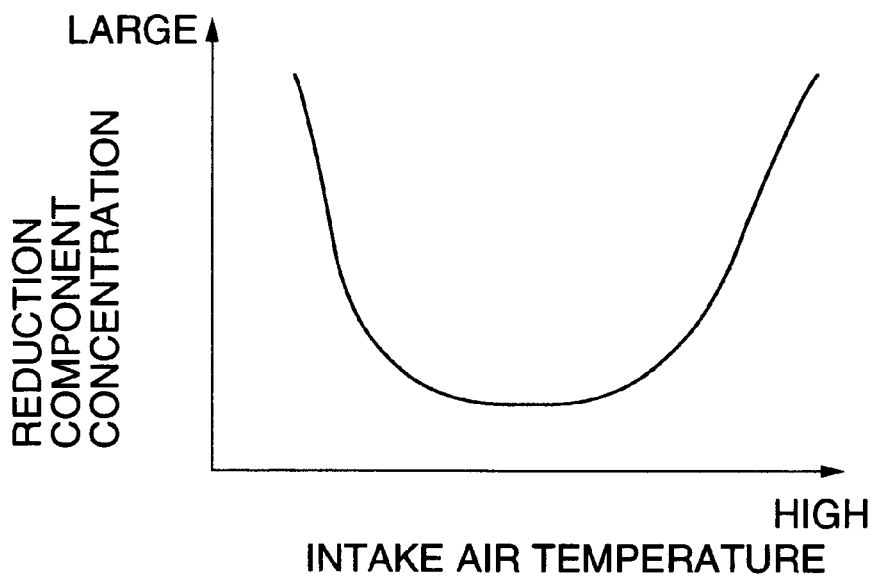
FIG. 11 is a diagram showing a relation of an intake air temperature and the reduction component concentration.

In a diesel engine, excepting for the very low temperature region, the HC concentration of the exhaust gas generally increases the higher the intake air temperature, as shown in FIG. 11. Therefore, the HC concentration of the exhaust gas can be increased by increasing the target flowrate distribution TB.

However, as the air density falls when the intake air temperature increases, the oxygen concentration of the exhaust gas may fall a little.

In a step S907, a value obtained by adding a predetermined increase correction value EI to the target exhaust gas recirculation rate calculated using the same map as that of the step S407, is set to the target exhaust gas recirculation rate TE.

This is because in a diesel engine, the HC concentration of the exhaust gas generally increases the higher the exhaust gas recirculation rate, as shown in FIG. 9. However, as the intake air amount will decrease if the exhaust gas recirculation rate is increased, the oxygen concentration of the exhaust gas may fall a little.

According to the method wherein a fixed value is added to a value calculated from the normal running map as described above, the increase of HC concentration or variation of exhaust gas characteristics other than HC will always be shifted by a fixed amount in comparison to normal running. Further, the HC concentration may also be increased by simply setting the target exhaust gas recirculation rate TE to a value corresponding to when the exhaust gas recirculation control valve 37 is fully open.

In a step S908, a value obtained by adding a predetermined increase correction value NI to the target nozzle angle of the turbocharger 23 calculated using the same map as that of the step S408, is set to the target nozzle angle TN.

Figure 12:
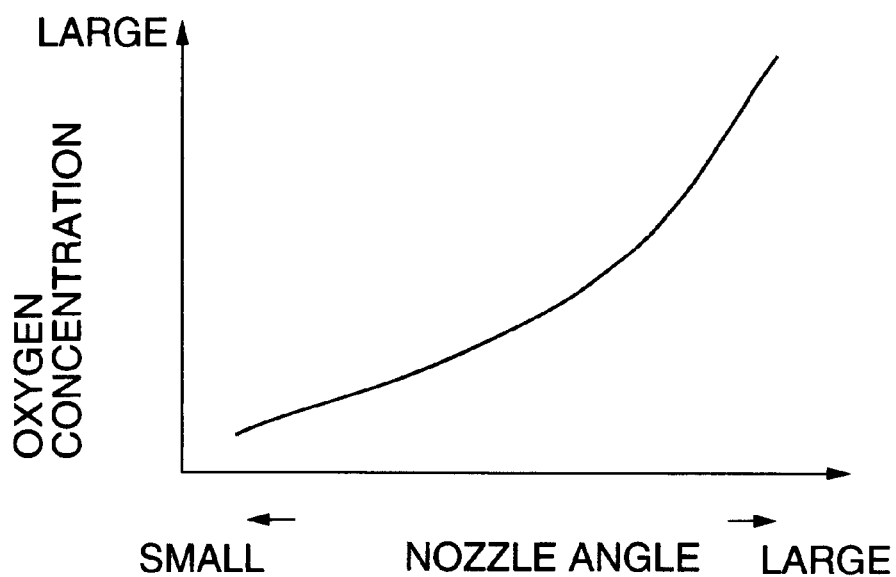
FIG. 12 is a diagram showing a relation of a nozzle angle of a turbocharger having an adjustable nozzle, and the oxygen concentration of the exhaust gas.

This is because the charging pressure rises and the oxygen concentration of the exhaust gas increases when the nozzle angle of the turbocharger 23 is increased, as shown in FIG. 12.

In this embodiment, increase of intake air temperature or increase of the exhaust gas recirculation rate are used to increase the reduction component concentration, but both of these methods tend to reduce the oxygen concentration of the exhaust gas. Decrease of the oxygen concentration is therefore suppressed by increasing the nozzle angle.

If decrease of the oxygen concentration does not pose a problem, i.e., when the oxygen concentration of the exhaust gas does not fall to 4.5% or less, the increase of the nozzle angle may be omitted. Further, the retardation of fuel injection timing or decrease of fuel pressure are not accompanied by a decrease of oxygen concentration, so if the HC concentration can be increased using only these controls, it is unnecessary to increase the nozzle angle.

In this embodiment, the HC concentration of the exhaust gas is increased by five methods, i.e., retardation of fuel injection timing, decrease of fuel pressure, change of swirl control valve opening degree, increase of intake air temperature, and increase of exhaust gas recirculation rate, but if the HC concentration of the exhaust gas can be increased to 200 ppm or higher, it is not absolutely necessary to apply all of these techniques.

The control of the actuators and valves using the control values set as described hereabove may be performed by methods known in the art. These methods will now be briefly described.

Regarding fuel injection control, when the crank angle of the engine 1 coincides with the fuel injection timing IT stored in the memory, the controller 40 starts to output a pulse signal to the fuel injector 8, and after injection is performed corresponding to the fuel injection pulse width T stored in the memory, the output of the pulse signal is terminated.

For fuel pressure control, the fuel pressure signal P detected by the pressure sensor 9 is compared with the fuel pressure TP stored in the memory, and when P>TP, a signal is output to increase the opening degree of the solenoid valve 4. Conversely, when P<TP, a signal is output to decrease the opening degree of the solenoid valve 4.

Regarding control of the swirl control valve, bypass control valve, exhaust gas recirculation control valve and charging pressure, control signals respectively corresponding to target values TS, TB, TE and TN stored in the memory are output to the swirl control valve actuator 17, bypass control valve 25, exhaust gas recirculation control valve 37 and nozzle vane actuator 32, respectively.

Next, a second embodiment of this invention will be described referring to FIGS. 13–16.

In this embodiment, the decrease of reduction component concentration is achieved by advancing the fuel injection timing, and the increase of the reduction component concentration is achieved by a secondary injection.

Secondary injection means a supplementary injection of fuel performed after the primary fuel injection for generating the engine torque.

The construction of the engine is the same as that of FIG. 1, but the swirl control valve 15 and bypass passage 24 may be omitted. Further, the main engine control routine applied in this embodiment is the same as that of the main routine of the aforesaid first embodiment shown in FIG. 3.

FIGS. 13–15 correspond to FIGS. 4–6 of the aforesaid first embodiment. Processes which perform the same processing as those of the aforesaid first embodiment are assigned identical step numbers.

FIG. 13 shows a subroutine for setting control values for normal running. This subroutine comprises the same steps S401, S402, S403 and S408 as in the aforesaid first embodiment, and a new step S414.

After setting the fuel injection amount Q, fuel injection pulse width T and fuel injection timing IT in the steps S401–S403, the subroutine proceeds to the step S414. Here, a pulse width Tpos of the secondary injection is set to 0. That is, secondary injection is not performed during normal running.

In the following step S408, the target nozzle angle TN of the turbocharger 23 is calculated as in the aforesaid first embodiment, and the subroutine is terminated.

FIG. 14 shows a subroutine for setting control values for decreasing the reduction component concentration. This subroutine comprises the same steps S701, S702, S703 and S708 as in the aforesaid first embodiment, and a new step S714.

In the step S714, the secondary injection pulse width Tpos is set to 0 as in the step S414.

FIG. 15 shows a subroutine for setting control values for increasing the reduction component concentration. This subroutine comprises the same steps S901, S902 and S908 as in the aforesaid first embodiment, and new steps S913–S916.

In this subroutine, after setting the fuel injection amount Q and fuel injection pulse width T in the steps S901, S902, the fuel injection timing IT is calculated in the step S913 by looking up the fuel injection timing map for normal running prestored in the controller 40, based on the accelerator depression degree Acc and the engine rotation speed Ne. This is identical to the processing of the step S403 for normal running.

Figure 16:
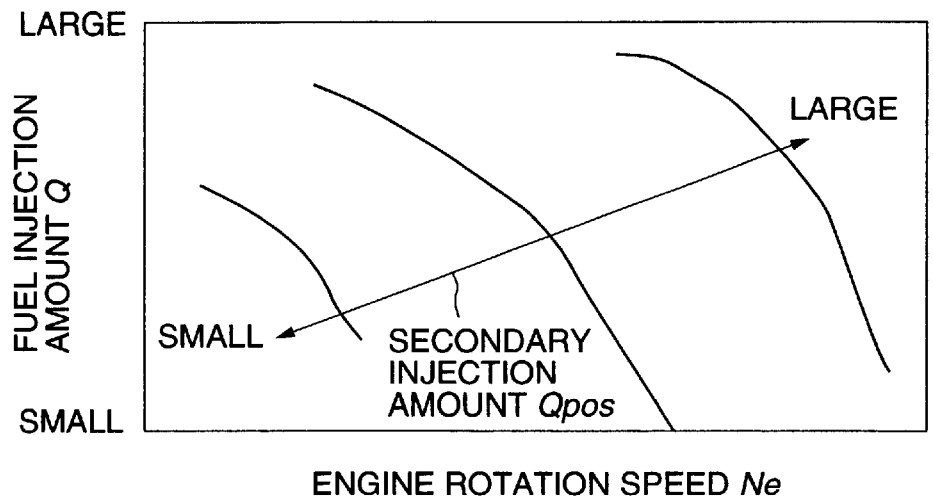
FIG. 16 is a map specifying a relation of an engine rotation speed, fuel injection amount, and a supplementary injection amount stored by the controller according to the second embodiment of this invention.

In the step S914, a secondary fuel injection amount Qpos is calculated by looking up a secondary fuel injection amount map for increasing the reduction component concentration prestored in the controller 40, based on the fuel injection amount Q and the engine rotation speed Ne. This map has the characteristic that the secondary fuel injection amount Qpos increases the larger the fuel injection amount Q and engine rotation speed Ne, as shown in FIG. 16. Therefore, the secondary fuel injection amount Qpos also increases together with increase of exhaust gas flowrate.

In a step S915, a secondary fuel injection pulse width Tpos is calculated based on the secondary fuel injection amount Qpos and fuel pressure P.

In a step S916, a secondary fuel injection timing ITpos is calculated by looking up a secondary fuel injection timing map for increasing the reduction component concentration prestored in the controller 40, based on the secondary fuel injection amount Qpos and the engine rotation speed Ne. This map specifies the start timing of secondary fuel injection. The secondary injection is performed during the explosion stroke or the exhaust stroke.

In a step S908, the target nozzle angle TN of the turbocharger 23 is set as in the aforesaid first embodiment. When secondary injection is performed, part of the fuel injected in the secondary injection reacts with the oxygen in the exhaust gas, so the oxygen concentration of the exhaust gas is decreased. The decrease of the oxygen concentration is therefore suppressed by increasing the nozzle angle. However, if the decrease of oxygen concentration due to secondary injection is negligible, this step S908 can be omitted.

After performing the step S908, the subroutine is terminated.

In this embodiment, as secondary injection is performed as well as a primary fuel injection, the fuel injection of the fuel injector 8 is performed by the following process.

The control of the primary injection is the same as that described for the aforesaid first embodiment. Concerning the secondary injection, if the crank angle of the engine 1 coincides with a secondary fuel injection timing ITpos stored in the memory, the controller 40 starts to output a secondary injection pulse signal to the fuel injector 8, and after injecting is performed corresponding to the injection pulse width Tpos stored in the memory, output of the secondary injection pulse signal is stopped.

Next, a third embodiment of this invention will be described referring to FIGS. 17–20.

This embodiment realizes the decrease of reduction component concentration by an advance correction of the fuel injection timing, and realizes the increase of reduction component concentration by supplying a reducing agent upstream of the catalytic converter 38 of the exhaust passage 31.

Figure 17:
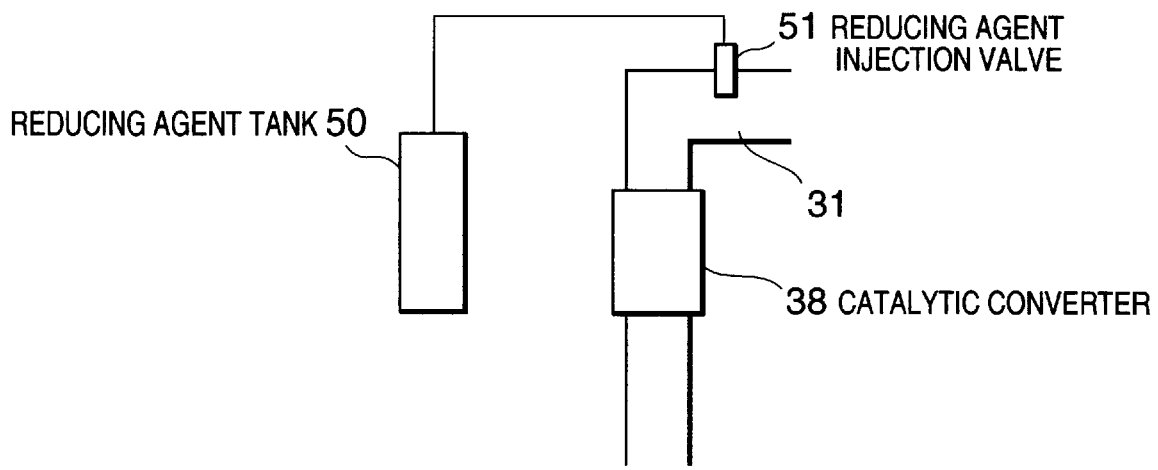
FIG. 17 is a schematic diagram of the essential parts of an exhaust gas purification device equipped with a reducing agent supply device according to a third embodiment of this invention.

For this purpose, the exhaust gas purifying device according to this embodiment comprises a reducing agent tank 50 which stores a reducing agent such as hydrogen (H) and hydrocarbons (HC), and a reducing agent injection valve 51 which injects the reducing agent of the reducing agent tank 50 into the exhaust passage 31, as shown in FIG. 17.

The remaining features of the construction of the engine 1 are the same as those of the aforesaid first embodiment. In this embodiment too, the swirl control valve 15 and the bypass passage 24 may be omitted. Further, the main engine control routine applied in this embodiment is the same as that of the main routine of the aforesaid first embodiment shown in FIG. 3.

FIGS. 18–20 which represent the subroutines according to this embodiment correspond to FIGS. 4–6 of the aforesaid first embodiment. Processes which perform the same processing as those of the aforesaid first embodiment are assigned identical step numbers.

FIG. 18 shows a subroutine for setting control values for normal running. This subroutine comprises the same steps S401, S402, S403 and S408 as in the aforesaid first embodiment, and a new step S424.

After setting the fuel injection amount Q, fuel injection pulse width T and fuel injection timing IT in the steps S401–S403, the subroutine proceeds to the step S424. Here, a duty ratio D of a duty control signal output to the reducing agent injection valve 51 is set to 0. The duty ratio D shows a time proportion between ON and OFF of the duty control signal. When D=0, it means that the ON time is 0, i.e., reducing agent is not supplied during normal running.

In the following step S408, the target nozzle angle TN of the turbocharger 23 is calculated as in the aforesaid first embodiment, and the subroutine is terminated.

FIG. 19 shows a subroutine which sets control values for decreasing the reduction component concentration. This subroutine comprises the same steps S701, S702, S703 and S708 as in the aforesaid first embodiment, and a new step S724.

After setting the fuel injection amount Q, fuel injection pulse width T and fuel injection timing IT in the steps S701–S703, the subroutine proceeds to the step S724. Herein, the duty ratio D of the duty control signal output to the reducing agent injection valve 51 is set to 0 as in the aforesaid step S424.

In the following step S708, the target nozzle angle TN of the turbocharger 23 is calculated as in the aforesaid first embodiment, and the subroutine is terminated. The only difference of this subroutine from the subroutine for normal running is the fact that an advance correction of the fuel injection timing is applied.

FIG. 20 shows a subroutine which sets control values for increasing the reduction component concentration. This subroutine comprises the same steps S901, S902 and S908 as in the aforesaid first embodiment, the same step S923 as in the aforesaid second embodiment, and a new step S924.

In this subroutine, after setting the fuel injection amount Q and fuel injection pulse width Tin the steps S901, S902, the fuel injection timing IT is calculated by the same map as for normal running in the step S913.

In the step S924, the duty ratio D of the duty control signal output to the reducing agent injection valve 51 is calculated by looking up a duty ratio map for increasing reduction component concentration prestored in the controller 40, based on the fuel injection amount Q and the engine rotation speed Ne. This map is set to assign a larger value to the duty ratio D the larger the fuel injection amount Q and engine rotation speed Ne. Therefore, more reducing agent is supplied to the exhaust passage 31 as the exhaust gas flowrate increases. It may be noted that if the reducing agent pressure supplied to the reducing agent injection valve 51 is kept constant, the duty ratio D is directly proportional to a reducing agent injection amount per unit time.

After setting the duty ratio D, the target nozzle angle TN of the turbocharger 23 is set as in the aforesaid first embodiment in the step S908, and the subroutine is terminated.

In this embodiment also, if the decrease of oxygen concentration due to the reducing agent supply is negligible the step S908 may be omitted.

In this embodiment, the controller 40 controls the reducing agent injection valve 51 by outputting a duty control signal to the reducing agent injection valve 51 according to the duty ratio D stored in the memory.

Next, a fourth embodiment of this invention will be described referring to FIGS. 21–24.

This embodiment realizes the decrease of reduction component concentration by use of an oxidation catalyst, and realizes the increase of reduction component concentration by retardation of the fuel injection timing.

Figures 21, 25:
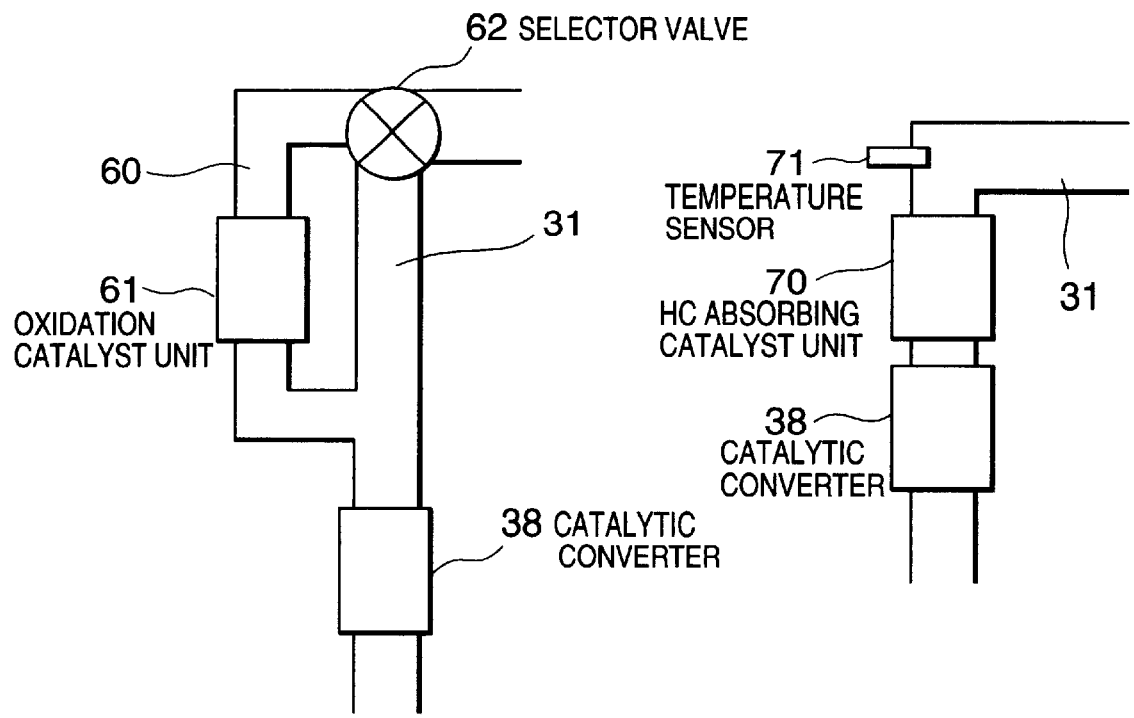
FIG. 21 is a schematic diagram of the essential parts of an exhaust gas purification device equipped with an oxidation catalyst according to a fourth embodiment of this invention.
FIG. 25 is a schematic diagram of the essential parts of an exhaust gas purification device equipped with an HC absorbing catalyst according to a fifth embodiment of this invention.
Figure 31:
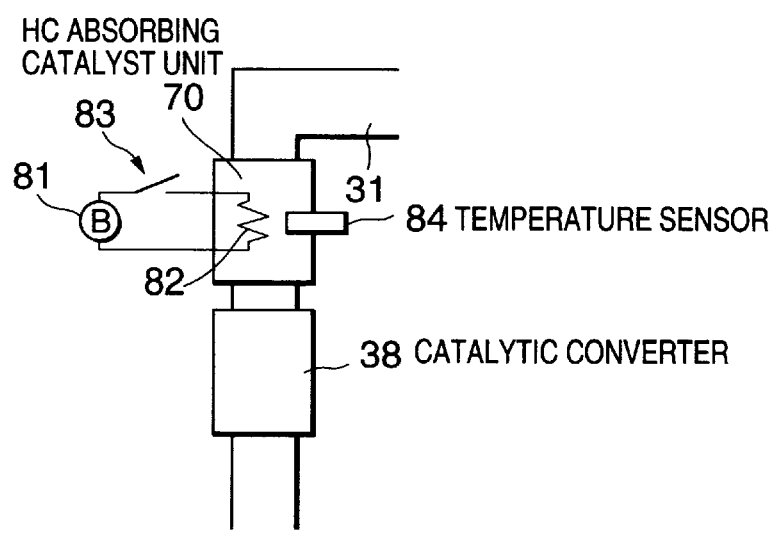
FIG. 31 is a schematic diagram of the essential parts of an exhaust gas purification device equipped with an HC absorbing catalyst provided with a heater according to a sixth embodiment of this invention.

For this purpose, a branch passage 60 is branched off from the exhaust passage 31 upstream of the catalytic converter 38, and an oxidation catalyst unit 61 is provided in the branch passage 60 as shown in FIG. 21. A selector valve 62 is also provided at the branch-off of the branch passage 60 from the exhaust passage 31. The branch passage 60 is joined again to the exhaust passage 31 after passing through the oxidation catalyst unit 61.

The remaining features of the construction of the engine 1 are identical to those of the aforesaid first embodiment.

In this embodiment too, the swirl control valve 15 and the bypass passage 24 may be omitted, and the turbocharger 23 may also be omitted. Further, the main engine control routine applied in this embodiment is the same as that of the main routine of the aforesaid first embodiment shown in FIG. 3.

FIGS. 22–24 which represent the subroutines according to this embodiment correspond to FIGS. 4–6 of the aforesaid first embodiment. Processes which perform the same processing as those of the aforesaid first embodiment are assigned identical step numbers.

FIG. 22 shows a subroutine for setting control values for normal running. This subroutine comprises the same steps S401, S402 and S403 as in the aforesaid first embodiment, and a new step S434.

After setting the fuel injection amount Q, fuel injection pulse width T and fuel injection timing IT in the steps S401–S403, the subroutine proceeds to the step S434.

Here, a change-over flag Fs is set to 0, and the subroutine is terminated. The change-over flag Fs is a flag which indicates the change-over of the selector valve 62 for the controller 40.

The set change-over flag Fs is stored in the memory of the controller 40.

FIG. 23 shows a subroutine which sets control values for decreasing the reduction component concentration. This subroutine comprises the same steps S701, S702 as in the aforesaid first embodiment, and new steps S733, S734.

After setting the fuel injection amount Q and fuel injection pulse width T in the steps S701 and S702, the subroutine proceeds to the step S733. Here, the fuel, injection timing IT is calculated by looking up the normal running map pre-stored in the controller 40, based on the accelerator depression degree Acc and the engine rotation speed Ne. This is identical to the processing of the step S403 for normal running.

In the step S734, the change-over flag Fs is set to 1, and the subroutine is terminated. The set change-over flag Fs is stored in the memory of the controller 40.

FIG. 24 shows a subroutine which sets control values for increasing the reduction component concentration. This subroutine comprises the same steps S901, S902 and S903 as in the aforesaid first embodiment, and a new step S934.

After setting the fuel injection amount Q, fuel injection pulse width T and fuel injection timing IT in the steps S901–S903, the subroutine proceeds to the step S934. Here, the change-over flag Fs is set to 0, and the subroutine is terminated. The set change-over flag Fs is stored in the memory of the controller 40.

In this embodiment, the controller 40 opens and closes the selector valve 62 according to the change-over flag Fs stored in the memory. When the change-over flag Fs is 0, the branch passage 60 is closed and all of the exhaust gas is passed into the exhaust passage 31. When the change-over flag Fs is 1, the controller 40 closes the exhaust passage 31, and all of the exhaust gas is passed into the branch passage 60.

As the oxidation catalyst unit 61 is provided in the branch passage 60, when the change-over flag Fs is 1, the exhaust gas flows into the catalytic converter 38 after the reduction component concentration is decreased in the oxidation catalyst unit 61.

For this reason, when the change-over flag Fs changes from 0 to 1, oxidation components of the exhaust gas flowing into the catalytic converter 38 decrease, and when the change-over flag Fs changes from 1 to 0, oxidation components of the exhaust gas flowing into the catalytic converter 38 again increase.

This embodiment is an embodiment which applied this invention to a diesel engine, but if this invention is applied to a gasoline engine wherein the HC concentration is relatively high during normal running, the use of the oxidation catalyst unit 61 as in this embodiment is particularly effective.

Next, a fifth embodiment of this invention will be described referring to FIGS. 25–29.

This embodiment realizes the decrease of reduction component concentration by adsorption of HC in the exhaust gas by an HC absorbing catalyst, and realizes the increase of reduction component concentration by HC discharge by the HC absorbing catalyst.

For this purpose, an HC absorbing catalyst unit 70 is provided upstream of the catalytic converter 38 of the exhaust passage 31, as shown in FIG. 25, and a temperature sensor 71 is provided near the entrance of the HC absorbing catalyst unit 70. The remaining features of the construction of the engine 1 are the same as those of the aforesaid first embodiment.

Figure 29:
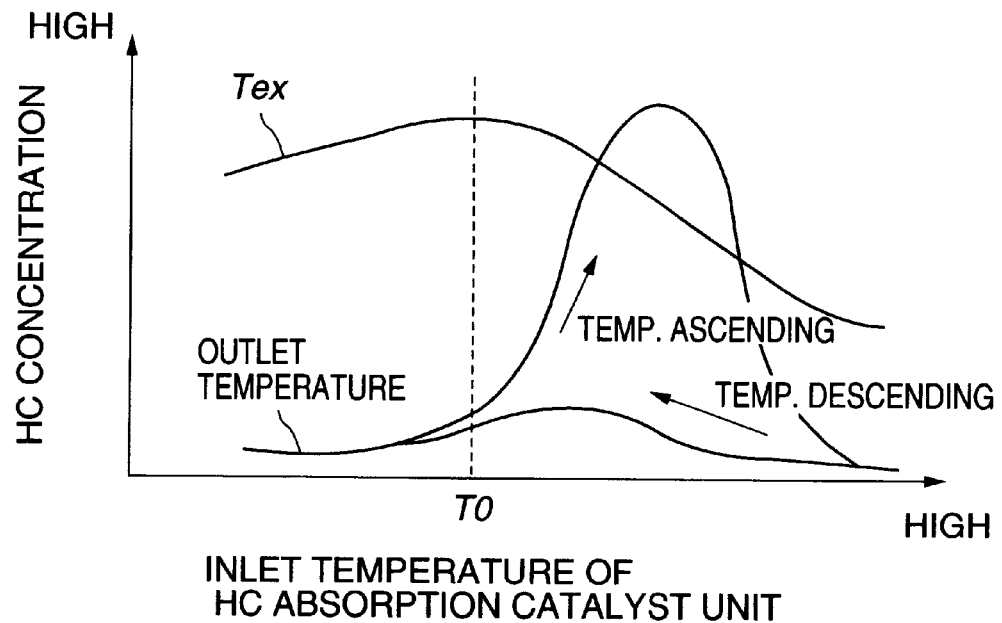
FIG. 29 is a diagram describing HC adsorption characteristics and HC discharge characteristics of the HC absorbing catalyst.

An HC absorbing catalyst which the HC absorbing catalyst unit 70 houses has the temperature characteristics shown in FIG. 29. Specifically, HC in the exhaust gas is absorbed when the temperature of the unit inlet is equal to or less than a predetermined temperature $T_0$. If the unit inlet temperature increases so that it exceeds the predetermined temperature $T_0$, the absorbed HC will be discharged by the increase of diffusion energy due to the temperature rise. As a result, the HC concentration at the unit outlet becomes higher than the HC concentration at the unit inlet. This predetermined temperature $T_0$ will hereafter be referred to as HC desorption temperature.

If temperature increase is continued, the HC absorbing catalyst will be activated and will oxidize HC. Consequently, the HC at the unit outlet decreases again.

On the other hand, if the unit inlet temperature falls from this high temperature region, as the HC adsorption amount is small, HC is not discharged as in the case of a temperature rise, and when the unit inlet temperature becomes lower than the predetermined temperature $T_0$, adsorption of HC begins again.

The HC desorption temperature $T_0$ is, for example, 200° C. Also in this embodiment, the swirl control valve 15, bypass passage 24 and turbocharger 23 may be omitted. Further, the main engine control routine applied in this embodiment is the same as that of the main routine of the aforesaid first embodiment shown in FIG. 3.

FIGS. 26–28 which represent the subroutines according to this embodiment correspond to FIGS. 4–6 of the aforesaid first embodiment. Processes which perform the same processing as those of the aforesaid first embodiment are assigned identical step numbers.

FIG. 26 shows a subroutine for setting control values for normal running. This subroutine comprises only the same steps S401, S402 and S403 as in the aforesaid first embodiment. Herein, only the fuel injection amount Q, fuel injection pulse width T and fuel injection timing IT are set.

FIG. 27 shows a subroutine for setting control values for decreasing reducing component concentration. This subroutine comprises the same steps S701, S702 and S703 as in the aforesaid first embodiment, and new steps S744–S746.

In the steps S701–S703, the fuel injection amount Q, fuel injection pulse width T and fuel injection timing IT are set.

Figure 30:
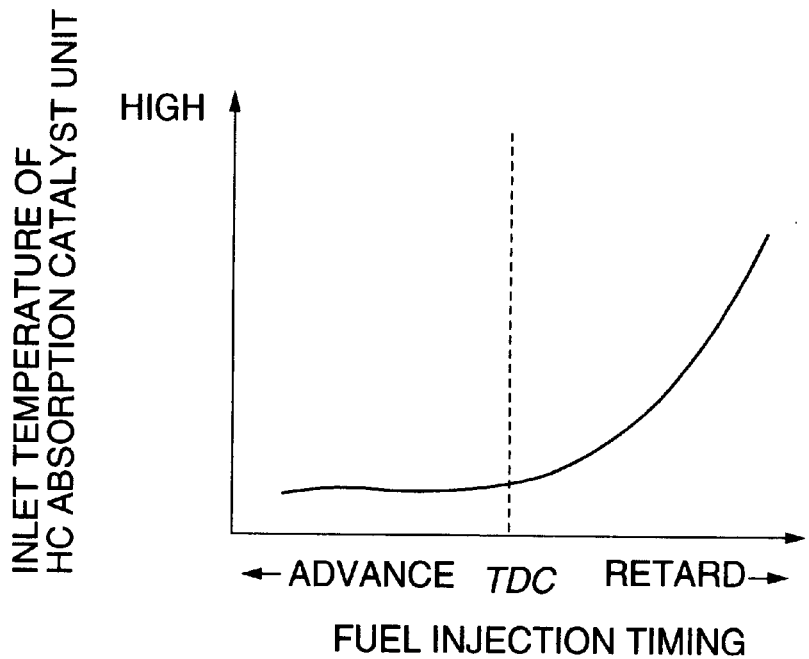
FIG. 30 is a diagram showing a relation of a fuel injection timing and an exhaust gas temperature.

As regards the fuel injection timing IT, a correction is performed using the advance correction value ITA, as described in the first embodiment. In general, in a diesel engine, if the fuel injection timing is advanced, the exhaust gas temperature falls, and if the timing is retarded, the exhaust gas temperature rises, as shown in FIG. 30. In this embodiment, the advance correction of fuel injection timing of the step S703 has the effect of maintaining the temperature of the HC absorbing catalyst unit 70 lower than the HC discharge temperature $T_0$.

In the new step S744, an inlet temperature Tex of the HC absorbing catalyst unit 70 detected by a temperature sensor 71 is read. In the step S745, the inlet temperature Tex is compared with the HC discharge temperature $T_0$.

It may occur that even if the fuel injection timing is advanced, the exhaust gas temperature may not immediately fall below the HC desorption temperature $T_0$ due to the effect of the heat capacity of the exhaust passage 31. For this reason, it is actually confirmed in this step whether or not the unit inlet temperature Tex is higher than the discharge temperature $T_0$.

When the unit inlet temperature Tex is higher than the discharge temperature $T_0$, the subroutine proceeds to the step S746. Here, the counter value C used in the main routine is reset to 0, and the subroutine is terminated.

On the other hand, when the unit inlet temperature Tex is equal to or less than the discharge temperature $T_0$ in the step S745, the subroutine is terminated without performing further steps.

Due to the processing of the above subroutine, when the unit inlet temperature Tex is higher than the discharge temperature $T_0$, the counter value C is reset on every occasion the subroutine is executed. As shown in FIG. 29, this temperature range is an HC discharging range, and it is unsuitable for decreasing the reduction component concentration which is the object of this subroutine. Therefore, the counter value C is reset to 0, and the period when the unit inlet temperature Tex is higher than the discharge temperature $T_0$ is not included in the first elapsed time. Due to this processing of the steps S745 and S746, only the period during which decrease processing of the reduction component concentration is actually performed is counted as the aforesaid first elapsed time.

FIG. 28 shows a subroutine which sets control values for increasing the reduction component concentration. This subroutine comprises the same steps S901, S902 and S903 as in the aforesaid first embodiment, and new steps S944–S946.

In the steps S901–S903, the fuel injection amount Q, fuel injection pulse width T and fuel injection timing IT are set by the same process as in the aforesaid first embodiment. Regarding the fuel injection timing IT, a correction by the retardation correction value ITR is performed as described in the first embodiment. In this embodiment, the retardation correction of fuel injection timing of the step S903 has the effect of maintaining the temperature of the HC absorbing catalyst unit 70 higher than the HC discharge temperature $T_0$.

In the new step S944, the inlet temperature Tex detected by the temperature sensor 71 is read.

In the step S945, the unit inlet temperature Tex is compared with the HC desorption temperature $T_0$.

It may occur that even if the fuel injection timing is retarded, the exhaust gas temperature may not immediately rise above the HC desorption temperature $T_0$ due to the effect of the heat capacity of the exhaust passage 31. For this reason, it is actually confirmed in this step whether or not the unit inlet temperature Tex is lower than the discharge temperature $T_0$.

When the unit inlet temperature Tex is lower than the desorption temperature $T_o$, the subroutine proceeds to the step S946. Here, the counter value C used in the main routine is reset to $C_o$, and the subroutine is terminated.

On the other hand, when the unit inlet temperature Tex is equal to or more than the discharge temperature $T_0$ in the step S945, the subroutine is terminated without performing further steps.

Due to the processing of the above subroutine, when the unit inlet temperature Tex is lower than the discharge temperature $T_0$, the counter value C is reset on every occasion the subroutine is executed. As shown in FIG. 29, this temperature range is an HC adsorption range, and it is unsuitable for increasing the reduction component concentration which is the object of this subroutine. Therefore, the counter value C is fixed at the first predetermined value $C_0$, and the period when the unit inlet temperature Tex is lower than the discharge temperature $T_0$ is not included in the second elapsed time. Due to this processing of the steps S945 and S946, only the period during which increase processing of the reduction component concentration is actually performed is counted as the aforesaid second elapsed time.

As HC is discharged from the HC absorbing catalyst, the oxygen concentration of the exhaust gas flowing into the catalytic converter 38 may decrease. If such a decrease of oxygen concentration is undesirable, the step S908 may be added to the subroutine of FIG. 28 as in the aforesaid first embodiment. The nozzle angle of the turbocharger 23 is thereby increased, the charging pressure Increases, and decrease of oxygen concentration is suppressed.

Next, a sixth embodiment of this invention will be described referring to FIGS. 31–34. In this embodiment also, the reduction component concentration of the exhaust gas is increased and decreased using the HC absorbing catalyst unit 70 as in the aforesaid fifth embodiment, but a heater 82 is further provided to the HC absorbing catalyst unit 70.

Power is supplied to the heater 82 from a battery 81 via a switch 83.

A temperature sensor 84 which detects the catalyst temperature inside the HC absorbing catalyst unit 70 is also provided. Such a catalyst unit with a heater may be implemented also by making the support for the HC absorbing catalyst a heater of metal construction.

The remaining features of the construction of the engine 1 are the same as those of the aforesaid first embodiment.

In this embodiment too, the swirl control valve 15, bypass passage 24 and turbocharger 23 may be omitted. Further, the main engine control routine applied in this embodiment is the same as that of the main routine of the aforesaid first embodiment shown in FIG. 3.

FIGS. 32–34 which represent the subroutines according to this embodiment correspond to FIGS. 4–6 of the aforesaid first embodiment. Processes which perform the same processing as those of the aforesaid first embodiment are assigned identical step numbers.

FIG. 32 shows a subroutine for setting control values for normal running. This subroutine comprises the same steps S401, S402 and S403 as in the aforesaid first embodiment, and a new step S454. After setting the fuel injection amount Q, fuel injection pulse width T and fuel injection timing IT in the steps S401–S403, the subroutine proceeds to the step S454.

Here, an energization flag Fe is set to 0, and the subroutine is terminated. The energization flag Fe is a flag which indicates ON/OFF of the switch 83 in the controller 40, and Fe=0 means OFF. The set energization flag Fe is stored in the memory of the controller 40.

FIG. 33 shows a subroutine which sets control values for decreasing the reduction component concentration. This subroutine comprises the same steps S701, S702 and S703 as in the aforesaid first embodiment, and new steps S754–S757.

After setting the fuel injection amount Q, fuel injection pulse width T and fuel injection timing IT in the steps S701–S703, the subroutine proceeds to the step S754. Here, the energization flag Fe is reset to 0.

In the following step S755, a temperature Tcat of the HC absorbing catalyst detected by the temperature sensor 84 is read. In the next step S756, the temperature Tcat of the HC absorbing catalyst is compared with the HC desorption temperature $T_0$.

When the temperature Tcat of the HC absorbing catalyst is higher than the HC desorption temperature $T_0$, after resetting the value of the counter C to 0 in the step S757, the subroutine is terminated.

On the other hand, when the temperature Tcat of the HC absorbing catalyst is equal to or less than the HC desorption temperature $T_0$, the subroutine is terminated without addressing further steps.

Due to the processing of this subroutine, when the temperature Tcat of the HC absorbing catalyst is higher than the HC desorption temperature $T_0$, the counter value C is reset to 0 on every occasion that the subroutine is executed. This is in order that only the period during which decrease processing of the reduction component concentration is actually performed is counted as the aforesaid first elapsed time, as in the aforesaid fifth embodiment.

FIG. 34 shows a subroutine which sets control values for increasing the reduction component concentration. This subroutine comprises the same steps S901 and S902 as in the aforesaid first embodiment, and new steps S953–S957.

In this subroutine, after setting the fuel injection amount Q and fuel injection pulse width T in the steps S901 and S902, the fuel injection timing IT is calculated by looking up the fuel injection timing map for normal running prestored in the controller 40 in the step S953, based on the accelerator depression degree Acc and the engine rotation speed Ne. This processing is identical to the processing of the step S403 of the aforesaid first embodiment.

In the step S954, the energization flag Fe is set to 1.

In the step S956, the temperature Tcat of the HC absorbing catalyst is compared with the HC desorption temperature $T_0$.

When the temperature Tcat of the HC absorbing catalyst is lower than the HC desorption temperature $T_0$, the value of the counter C is reset to $C_0$ in the step S957, and the subroutine is terminated.

On the other hand, when the temperature Tcat of the HC absorbing catalyst is equal to or greater than the HC desorption temperature $T_0$, the subroutine is terminated without addressing further steps.

Due to the processing of the above subroutine, when the temperature Tcat of the HC absorbing catalyst is less than the HC desorption temperature $T_0$, the counter value C is set to the first predetermined value $C_0$ on each occasion the subroutine is executed.

This is in order that only the period during which increase processing of the reduction component concentration is actually performed is counted as the aforesaid second elapsed time, as in the aforesaid fifth embodiment.

In this embodiment, when the reduction component concentration is increased, power is supplied to the heater 82 to forcibly raise the temperature of the HC absorbing catalyst, so the HC absorbed by the HC absorbing catalyst can be discharged and the reduction component concentration can be increased within a shorter time than in the aforesaid fifth embodiment.

If the oxygen concentration of the exhaust gas flowing into the catalytic converter 38 during HC discharge from the HC absorbing catalyst falls to 4.5% or less, the step S908 may be added to the subroutine of FIG. 28 as in the aforesaid first embodiment.

In all of the aforementioned embodiments, the catalyst/NOx absorbing material in the catalytic converter 38 was comprised of a coating layer of the noble metal platinum (Pt) and the NOx absorbing material barium (Ba) on an alumina substrate, however the various catalyst/NOx absorbing materials shown in FIGS. 38–45 may be used.

Alumina ($Al_2O_3$), silica ($SiO_2$), porous aluminosilicates (zeolite), silica-alumina ($SiO_2$—$AL_2O_3$), and titania ($TiO_2$) used as the substrate of the catalyst/NOx absorbing material, are all refractory inorganic oxides. These substrate materials have the following characteristics.

A titania substrate implements a catalyst/NOx absorbing material which is resistant to poisoning by sulfur present in the fuel.

A silica-alumina or porous aluminosilicate substrate provides an improvement in NOx reduction activity by HC with many carbon atoms.

A silica-alumina substrate also increases the durability of the substrate.

The catalyst/NOx absorbing material is a honeycomb-like monolithic catalyst comprising a noble metal and an NOx absorbing material supported on any of the aforesaid substrates having a specific surface of 120 $m^2$/gram or higher.

In Examples #192–223 of FIG. 45, the noble metal also functions as a NOx absorbing material.

Next, the method used by the inventors to obtain these catalyst/NOx absorbing materials will be described.

An alumina sol, prepared by mixing 10 grams of bemite alumina with 900 grams of a 1% aqueous nitric acid solution, and active gamma alumina powder, were introduced into a magnetic ball mill, and pulverized to obtain an alumina slurry. This slurry was made to adhere to a cordierite monolithic substrate of 1 liter capacity and comprising 400 cells, and baked at 400° C. for 1 hour to obtain a coating layer of 100 gram/liter.

The coating layer obtained was impregnated with an aqueous barium acetate solution, dried, and fired in air at 400° C. for 1 hour. The barium content of the material was 15.0 gram/liter.

The coating layer obtained was impregnated with a mixed aqueous solution of dinitrodiamine and platinum, dried, and fired in air at 400° C. for 1 hour to obtain an exhaust gas purification catalyst/NOx absorbing material. The platinum content of this catalyst/NOx absorbing material was 1.18 grams/liter.

The contents of Tokugan Hei 10-319689, with a filing date of Nov. 11, 1998 in Japan, and Tokugan Hei 10-291581, with a filing date of Oct. 14, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, instead of aqueous barium acetate solution, the following compounds may be used to manufacture the catalyst/NOx absorbing material.

| | |
|---|---|
| Barium Ba | $Ba(CH_3COO)_2.H_2O$ |
| Potassium | $KCH_3COO.2H_2O$ |
| Sodium | $NaNO_3$ |
| Lithium | $LiNO_3$ |
| Cesium | $Cs(CH_3COO)$ |
| Magnesium | $Mg(NO_3)_2.6H_2O$ |
| Calcium | $Ca(NO_3)_3$ |
| Strontium | $Sr(CH_3COO)$ |
| Lanthanum | $La(NO_3)_3$ |
| Cerium | $Ce(CH_3COO)_3$ |
| Yttrium | $Y(NO_3)_3.6H_2O$ |
| Praseodymium | $Pr(NO_3)_3$ |
| Neodymium | $Nd(CH_3COO)_3$ |
| Samarium | $Sm(NO_3)_3.6H_2O$ |
| Zirconium | $ZrO(NO_3)_2.2H_2O$ |
| Manganese | $Mn(NO_3)_2$ |
| Iron | $Fe(NO_3)_3.9H_2O$ |
| Nickel | $Ni(NO_3)_2.6H_2O$ |
| Cobalt | $Co(NO_3)_2.6H_2O$ |

| | |
|---|---|
| Tungsten | $(NH_4)_{10}[W_{12}O_{42}H_2] \cdot 10H_2O$ |
| Molybdenum | $(NH_4)_6[Mo_7O_{24}] \cdot 4H_2O$ |

Further, instead of the mixed aqueous solution of dinitrodiamine and platinum, a similar catalyst /NOx absorbing material for exhaust gas purification can be obtained by using rhodium nitrate, palladium nitrate or iridium nitrate.

The embodiments of this invention in which an exclusive property or privilege is claimed are defined as follows:

What is claimed is:

1. A device for purifying exhaust gas containing nitrogen oxides in an exhaust passage of a combustion device, comprising:
    a nitrogen oxide absorbing material which absorbs nitrogen oxide when a reduction component concentration of the exhaust gas is lower than a predetermined concentration, and discharges nitrogen oxide when the reduction component concentration of the exhaust gas is higher than the predetermined concentration,
    a catalyst which promotes reduction of discharged nitrogen oxide by a reduction component in the exhaust gas,
    means for decreasing the reduction component concentration of the exhaust gas,
    means for increasing the reduction component concentration of the exhaust gas, and
    a microprocessor programmed to:
        determine whether the nitrogen oxide should be discharged from the nitrogen oxide absorbing material or the catalyst,
        control the decreasing means for a first predetermined time period when it is determined that the nitrogen oxide should be discharged from the nitrogen oxide absorbing material or the catalyst, so that the reduction component concentration of the exhaust gas is less than a first predetermined concentration of 100 ppm,
        control the increasing means so that the reduction component concentration of the exhaust gas is higher than a second predetermined concentration for a second predetermined time period after the first predetermined time period has elapsed, and
        maintain the amount of oxygen in the exhaust gas at a level of 4.5% or greater.

2. An exhaust gas purifying device as defined in claim 1, wherein the second predetermined concentration is 200 ppm.

3. An exhaust gas purifying device as defined in claim 1, wherein the increasing means comprises means for increasing the reduction component concentration without decreasing the oxygen concentration of the exhaust gas.

4. An exhaust gas purifying device as defined in claim 1, wherein the combustion device comprises an engine provided with a combustion chamber, the decreasing means comprises a fuel injector which injects fuel directly into the combustion chamber, and the microprocessor is further programmed to control the fuel injector to decrease the reduction component concentration by advancing a fuel injection timing of the fuel injector.

5. An exhaust gas purifying device as defined in claim 1, wherein the engine is provided with a combustion chamber, the increasing means comprises a fuel injector which injects fuel directly into the combustion chamber, and the microprocessor is further programmed to control the fuel injector to increase the reduction component concentration by retarding a fuel injection timing of the fuel injector.

6. An exhaust gas purifying device as defined in claim 1, wherein the engine is provided with a combustion chamber, the increasing means comprises a swirl valve which forms a swirl in an air flow flowing into the combustion chamber, and the microprocessor is further programmed to control the swirl valve to increase the reduction component concentration by decreasing an opening of the swirl valve.

7. An exhaust gas purifying device as defined in claim 1, wherein the combustion device comprises an engine provided with an intake passage and an intercooler which cools an intake air in the intake passage, the increasing means comprises a bypass passage which bypasses the intercooler to lead intake air to the engine and a flow control valve which varies a flow rate of the bypass passage, and the microprocessor is further programmed to control the flow control valve to increase the reduction component concentration by causing the flow control valve to increase the flow rate of the bypass passage.

8. An exhaust gas purifying device as defined in claim 1, wherein the decreasing means comprises a branch passage which branches off from the exhaust passage and joins to the exhaust passage further downstream, an oxidation catalyst which oxidizes exhaust gas in the branch passage, and a flow control valve which varies the flowrate of the branch passage, and the microprocessor is further programmed to control the flow control valve to decrease the reduction component concentration by causing the flow control valve to increase the flowrate of the branch passage.

9. An exhaust gas purifying device as defined in claim 1, wherein the combustion device comprises an engine, the decreasing means comprises an exhaust gas recirculation passage which recirculates part of the exhaust gas as an intake air of the engine, and a flow control valve which varies a flowrate of exhaust gas in the exhaust gas recirculation passage, and the microprocessor is further programmed to control the flow control valve to decrease the reduction component concentration by causing the flow control valve to decrease the flowrate of the exhaust gas recirculation passage.

10. An exhaust gas purifying device as defined in claim 1, wherein the combustion device comprises an engine, the increasing means comprises an exhaust gas recirculation passage which recirculates part of the exhaust gas as an intake air of the engine, and a flow control valve which varies a flowrate of exhaust gas in the exhaust gas recirculation passage, and the microprocessor is further programmed to control the flow control valve to increase the reduction component concentration by causing the flow control valve to increase the flowrate of the exhaust gas recirculation passage.

11. An exhaust gas purifying device as defined in claim 1, wherein the combustion device comprises an engine provided with a combustion chamber, the increasing means comprises a fuel injector which injects fuel directly into the combustion chamber, and the microprocessor is further programmed to control the fuel injector to increase the reduction component concentration by causing the fuel injector to perform a secondary fuel injection.

12. An exhaust gas purifying device as defined in claim 1, wherein the increasing means comprises a reducing agent supply device which supplies a reducing agent, and the microprocessor is further programmed to control the reducing agent supply device to increase the reduction component concentration by causing the reducing agent supply device to supply the reducing agent to the exhaust gas.

13. An exhaust gas purifying device as defined in claim 1, wherein the combustion device comprises an engine provided with a combustion chamber, the decreasing means comprises a fuel injector which injects fuel directly into the combustion chamber, and a reduction component absorbing material which absorbs a reduction component in the exhaust gas when the exhaust gas temperature is lower than a predetermined temperature, and the microprocessor is further programmed to control the exhaust gas temperature to be lower than the predetermined temperature by advancing a fuel injection timing of the fuel injector.

14. An exhaust gas purifying device as defined in claim 1, wherein the increasing means comprises a reduction component absorbing material which absorbs a reduction component in the exhaust gas when the exhaust gas temperature is lower than a predetermined temperature and discharges the absorbed reduction component when the exhaust gas temperature is higher than the predetermined temperature, and a heater which raises the exhaust gas temperature, and the microprocessor is further programmed to control the exhaust gas temperature to be higher than the predetermined temperature by providing a current to the heater.

15. An exhaust gas purifying device as defined in claim 1, wherein the combustion device comprises an engine provided with a turbocharger; the exhaust gas purifying device further comprises means for increasing the charging pressure of the turbocharger, and the microprocessor is further programmed to control the increasing means to increase the charging pressure when the reduction component concentration of the exhaust gas exceeds the second predetermined concentration.

16. An exhaust gas purifying device as defined in claim 1, wherein the combustion device is a diesel engine.

17. An exhaust gas purifying device as defined in claim 1, wherein the nitrogen oxide absorbing material comprises any one of potassium, sodium, lithium, cesium, barium, magnesium, calcium, strontium, lanthanum, cerium, praseodymium, neodymium, samarium, manganese, iron, nickel, cobalt, zirconium and yttrium, and the catalyst comprises any one of platinum, palladium, rhodium and iridium.

18. An exhaust gas purifying device as defined in claim 1, wherein the nitrogen oxide absorbing material comprises tungsten, and the catalyst comprises any one of platinum, palladium, rhodium and iridium.

19. An exhaust gas purifying device as defined in claim 1, wherein the nitrogen oxide absorbing material comprises any two of potassium, sodium, lithium, cesium, barium, magnesium, calcium, strontium, lanthanum, cerium, praseodymium, neodymium, samarium, manganese, iron, nickel, cobalt, zirconium and yttrium, and the catalyst comprises any one of platinum, palladium, rhodium and iridium.

20. An exhaust gas purifying device as defined in claim 1, wherein the nitrogen oxide absorbing material comprises one of composite oxides of tungsten and zirconium, and the catalyst comprises any one of platinum, palladium, rhodium and iridium.

21. An exhaust gas purifying device as defined in claim 1, wherein the combustion device comprises an engine provided with a fuel injector for injecting fuel, the increasing means comprises a valve for decreasing an injection pressure of the fuel injector, and the microprocessor is further programmed to control the valve to increase the reduction component concentration by causing the valve to decrease the injection pressure.

22. An exhaust gas purifying device as defined in claim 1, wherein the nitrogen oxide absorbing material and catalyst are provided in the form of a monolithic catalyst supported on a honeycomb type substrate made of refractory inorganic oxide having a specific surface of not less than 120 m$^2$/gram.

23. An exhaust gas purifying device as defined in claim 22, wherein the refractory inorganic oxide comprises any one of alumina, silica, porous aluminosilicate, silica-alumina or titania.

24. A device for purifying exhaust gas containing nitrogen oxides in an exhaust passage of a combustion device, comprising:

nitrogen oxide absorbing means for absorbing nitrogen oxides when a reduction component concentration of the exhaust gas is lower than a predetermined concentration, and discharging nitrogen oxides when the reduction component concentration of the exhaust gas is higher than the predetermined concentration, catalyst means for promoting reduction of discharged nitrogen oxides by a reduction component in the exhaust gas, means for decreasing the reduction component concentration of the exhaust gas, means for increasing the reduction component concentration of the exhaust gas, means for determining whether the nitrogen oxide should be discharged from the nitrogen oxide absorbing material or the catalyst, means for controlling the decreasing means so that the reduction component concentration of the exhaust gas is less than a first predetermined concentration of 100 ppm for a first predetermined time period when the determining means determines that the nitrogen oxide should be discharged from the nitrogen oxide absorbing material or the catalyst, means for controlling the increasing means so that the reduction component concentration of the exhaust gas is higher than a second predetermined concentration for a second predetermined time period after the first predetermined time period has elapsed, and means for maintaining the concentration of oxygen in the exhaust gas at or above 4.5%.

25. A device for purifying exhaust gas containing nitrogen oxides in an exhaust passage of a combustion device, comprising:

a nitrogen oxide absorbing material which absorbs nitrogen oxides when a reduction component concentration of the exhaust gas is lower than a predetermined concentration, and discharges nitrogen oxides when the reduction component concentration of the exhaust gas is higher than the predetermined concentration, a catalyst which promotes reduction of discharged nitrogen oxides by a reduction component in the exhaust gas, means for decreasing the reduction component concentration of the exhaust gas, means for increasing the reduction component concentration of the exhaust gas, and a microprocessor programmed to:

determine whether the nitrogen oxide should be discharged from the nitrogen oxide absorbing material or the catalyst, control the decreasing means for a first predetermined time period when it is determined that the nitrogen oxide should be discharged from the nitrogen oxide absorbing material or the catalyst, so that the reduction component concentration of the exhaust gas is less than that when it is not determined that the nitrogen oxide should be discharged and is less than 100 ppm, control the increasing means so that the reduction component concentration of the exhaust gas is higher than that when it is not determined that the nitrogen oxide should be discharged, for a second predetermined time period after the first predetermined time period has elapsed, and maintain the amount of oxygen in the exhaust gas at a level of 4.5% or greater.

26. A device for purifying exhaust gas containing nitrogen oxides in an exhaust passage of a combustion device, comprising:

a nitrogen oxide absorbing material which absorbs nitrogen oxide when a reduction component concentration of the exhaust gas is lower than a predetermined concentration, and discharges nitrogen oxide when the reduction component concentration of the exhaust gas is higher than the predetermined concentration, a catalyst which promotes reduction of discharged nitrogen oxide by a reduction component in the exhaust gas, means for decreasing the reduction component concentration of the exhaust gas, means for increasing the reduction component concentration of the exhaust gas, and a microprocessor programmed to:

control the decreasing means so that the reduction component concentration of the exhaust gas is less than a first predetermined concentration, and control the increasing means so that the reduction component concentration of the exhaust gas is higher than a second predetermined concentration after controlling the decreasing means, wherein the microprocessor is programmed to control the decreasing means to maintain 4.5% or more oxygen in the exhaust gas, wherein the microprocessor is programmed to control the increasing means to maintain 4.5% or more oxygen in the exhaust gas, and wherein the first predetermined concentration is 100 ppm.

* * * * *